(12) United States Patent
Nishihara

(10) Patent No.: US 6,454,969 B1
(45) Date of Patent: Sep. 24, 2002

(54) SILICON-CONTAINING FLAME RETARDANT

(75) Inventor: Hajime Nishihara, Yokohama (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/601,701

(22) PCT Filed: Feb. 5, 1999

(86) PCT No.: PCT/JP99/00500

§ 371 (c)(1), (2), (4) Date: Aug. 4, 2000

(87) PCT Pub. No.: WO99/40158

PCT Pub. Date: Aug. 12, 1999

(30) Foreign Application Priority Data

Feb. 5, 1998 (JP) .......................... 10-024411

(51) Int. Cl.[7] .......................... C09K 21/00; C07F 7/04; C08L 83/06
(52) U.S. Cl. .................... 252/609; 252/601; 524/859; 524/588; 524/261; 525/474; 525/479; 556/450; 556/464; 556/465; 556/482; 556/483
(58) Field of Search ................... 556/450, 464, 556/465, 482, 483; 525/474, 479; 524/859, 261, 588; 252/601, 609

(56) References Cited

U.S. PATENT DOCUMENTS

| | | | | |
|---|---|---|---|---|
| 3,776,741 A | * | 12/1973 | Bockstie, Jr. ........... 106/15 FP |
| 4,072,636 A | * | 2/1978 | Ashida et al. |
| 4,197,384 A | * | 4/1980 | Bialous, et al. ............ 525/464 |
| 5,180,793 A | * | 1/1993 | Vigneault et al. ........... 525/446 |
| 5,326,803 A | * | 7/1994 | Avakian et al. ............ 524/120 |
| 6,284,824 B1 | * | 9/2001 | Iji et al. .................... 524/267 |

FOREIGN PATENT DOCUMENTS

| | | |
|---|---|---|
| EP | 0415070 A2 | 3/1991 |
| EP | 0771835 A2 | 5/1997 |
| JP | 07048454 A | 2/1995 |
| JP | 09111109 A | 4/1997 |
| JP | 09208744 A | 8/1997 |

OTHER PUBLICATIONS

Machine translation of JP 09–302140 from JPO website.*

* cited by examiner

Primary Examiner—Robert Dawson
Assistant Examiner—Jeffrey B. Robertson
(74) Attorney, Agent, or Firm—Birch, Stewart, Kolasch & Birch, LLP

(57) ABSTRACT

Disclosed is a silicon-containing flame retardant for an organic polymer, comprising a monomer, a polymer or a mixture thereof, which is represented by the following formula (1):

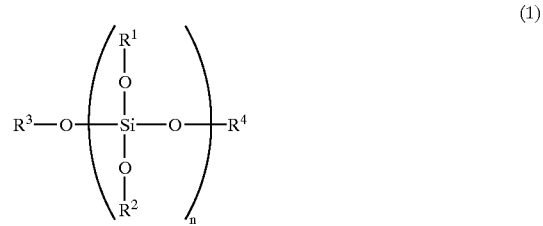

(1)

wherein each of $R^1$ and $R^2$ independently represents a monovalent $C_1$–$C_{20}$ hydrocarbon group; each of $R^3$ and $R^4$ independently represents a monovalent or divalent $C_1$–$C_{20}$ hydrocarbon group, with the proviso that, when each of $R^3$ and $R^4$ independently represents a divalent $C_1$–$C_{20}$ hydrocarbon group, $R^3$ and $R^4$ are bonded to each other to form a ring; and n is 1 or more in terms of the number average n-value.

9 Claims, 3 Drawing Sheets

SILICON-CONTAINING FLAME RETARDANT

This application is the national phase under 35 U.S.C. §371 of PCT International Application No. PCT/JP99/00500 which has an International filing date of Feb. 5, 1999, which designated the United States of America.

BACKGROUND OF THE INVENTION

1. Field of the Invention

The present invention relates to a silicon-containing flame retardant. More particularly, the present invention is concerned with a novel silicon-containing flame retardant for an organic polymer, comprising a monomer, a polymer or a mixture thereof, which is represented by the following formula (1):

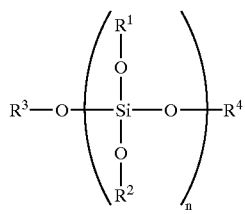

wherein each of $R^1$ and $R^2$ independently represents a monovalent $C_1$–$C_{20}$ hydrocarbon group; each of $R^3$ and $R^4$ independently represents a monovalent or divalent $C_1$–$C_{20}$ hydrocarbon group, with the proviso that, when each of $R^3$ and $R^4$ independently represents a divalent $C_1$–$C_{20}$ hydrocarbon group, $R^3$ and $R^4$ are bonded to each other to form a ring; and n is 1 or more in terms of the number average n-value.

The present invention is also concerned with a method for imparting a flame retardancy to an organic polymer, which comprises adding to an organic polymer the above-mentioned silicon-containing flame retardant.

When the silicon-containing flame retardant of the present invention is added to an organic polymer, the resultant composition exhibits not only excellent flame retardancy but also excellent impact strength and heat resistance.

2. Prior Art

Polymers, such as synthetic resins and elastomers, exhibit excellent moldability and high impact resistance, as compared to glass materials and metals. Therefore, polymers have been used in various fields, such as automobile parts, parts for household electric appliances and parts for office automation machines. However, the use of the polymers is limited due to the flammability thereof. Therefore, a number of proposals have been made with respect to the method for imparting flame retardancy to a polymer.

As a method for imparting a flame retardancy to a polymer, there is known a method in which a flame retardant, such as a halogen-containing flame retardant, a phosphorus-containing flame retardant or an inorganic flame retardant, is added to a polymer.

However, the conventional flame retardants have the following problems. The halogen-containing flame retardant is unfavorable from the viewpoint of the protection of environment. Specifically, the halogen-containing flame retardant generates an acidic gas during the burning thereof, and the generated acidic gas becomes causative of disadvantageous phenomena, such as corrosion of a combustion furnace and occurrence of acid rain. Further, the halogen-containing flame retardant is difficult to recycle. On the other hand, the phosphorus-containing flame retardant is hydrolyzable. Therefore, when a shaped article containing a phosphorus-containing flame retardant is exposed to the weather, the phosphorus-containing flame retardant bleeds out from the shaped article and hydrolyzed, thereby causing eutrophication. Further, the phosphorus-containing flame retardant is also difficult to recycle.

With respect to the polymers containing the phosphorus-containing flame retardant and/or the inorganic flame retardant, the heat stability, impact strength, melt-fluidity and heat resistance thereof are not always satisfactory, so that the industrial use of such polymers is limited.

Further, in recent years, there has been a strong demand for improving safety of materials against fire. In order to meet such a strong demand, improved techniques for imparting flame retardancy to polymers have been developed. However, such flame retardancy-imparting techniques are accompanied by problems, such as harmful effects on the environment and a lowering of the mechanical properties of the polymers.

Under these circumstances, flame retardancy-imparting techniques using a silicon-containing flame retardant, which is not accompanied by the above-mentioned problems, have been developed.

As an example of silicon-containing flame retardants, a silicone or silicone resin, such as dimethyl-silicone, is known. A flame retardant resin composition containing a silicone or silicone resin is free from the above-mentioned problems (regarding the recycling and the environment) accompanying the use of the halogen- or phosphorus-containing flame retardant. However, the flame retardancy of the flame retardant resin compositions containing a silicone or a silicone resin is poor, and, therefore, cannot be put into practical use.

As another example of silicon-containing flame retardants, an organosilicate is known. For example, a flame retardant resin composition comprising an aromatic polycarbonate and a silicate resin is disclosed in EP 415070 A2 (corresponding to Unexamined Japanese Patent Application Laid-Open Specification No. 3-143951). However, the above-mentioned organosilicate resin has a branched structure and a crosslinked structure and, hence, exhibits a poor dispersibility in a resin mixed with the organosilicate resin. Further, the performance of this organosilicate resin as a flame retardant is not satisfactory.

Unexamined Japanese Patent Application Laid-Open Specification No. 9-111109 discloses a flame retardant resin composition composed of a polycarbonate resin, polymethylethoxysiloxane, titanium oxide, polytetrafluoroethylene, a halogen-containing flame retardant and a thermoplastic elastomer. The organoalkoxypolysiloxane (i.e., polymethylethoxysiloxane) used as a flame retardant in this resin composition is an organosilicate which contains Si—O—R linkages and Si—R linkages (each R is a hydrocarbon group). Due to the presence of the Si—R linkages, the organoalkoxypolysiloxane cannot impart a satisfactory flame retardancy to a resin.

Further, EP 771835A2 (corresponding to Unexamined Japanese Patent Application Laid-Open Specification Nos. 9-165452 and 9-165451) and Unexamined Japanese Patent Application Laid-Open Specification Nos. 7-48454 and 9-208744 disclose resin compositions containing a linear organosilicate. However, each of the resin compositions disclosed in these patent documents is a coating composition, in which the linear organosilicate is used merely as a curing agent.

As can be seen from the above, there has conventionally been no report that the linear organosilicate can be used for imparting a polymer with excellent properties, such as high flame retardancy, high impact strength and high heat resistance.

SUMMARY OF THE INVENTION

In this situation, the present inventors have made extensive and intensive studies with a view toward developing a flame retardant which is free from the above-mentioned problems and can be used for imparting an excellent flame retardancy to a polymer.

As a result, it has unexpectedly been found that, when a specific, silicon-containing flame retardant described below is used, not only can a flame retardancy of an organic polymer be greatly improved, but also an organic polymer can be imparted with high impact strength and high heat resistance. The above-mentioned specific, silicon-containing flame retardant comprises a monomer, a polymer or a mixture thereof, which is represented by the following formula (1):

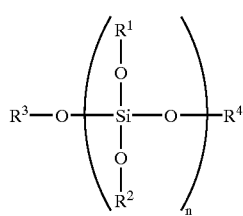

(1)

wherein:
each of $R^1$ and $R^2$ independently represents a monovalent $C_1$–$C_{20}$ hydrocarbon group;
each of $R^3$ and $R^4$ independently represents a $C_1$–$C_{20}$ alkyl group or a monovalent $C_6$–$C_{20}$ aromatic group or independently represents a $C_1$–$C_{20}$ alkylene group or a divalent $C_6$–$C_{20}$ aromatic group, with the proviso that, when each of $R^3$ and $R^4$ independently represents a $C_1$–$C_{20}$ alkylene group or a divalent $C_6$–$C_{20}$ aromatic group, $R^3$ and $R^4$ are bonded to each other to form a ring; that all of $R^1$, $R^2$, $R^3$ and $R^4$ are not simultaneously alkyl groups or monovalent aromatic groups; that, when each of $R^1$ and $R^2$ is an alkyl group, both of $R^3$ and $R^4$ are not simultaneously alkylene groups; and that, when each of $R^1$ and $R^2$ is a monovalent aromatic group, both of $R^3$ and $R^4$ are not simultaneously divalent aromatic groups;
n is 1 or more in terms of the number average n-value.

The present invention has been completed, based on this novel finding.

Therefore, it is a primary object of the present invention to provide a silicon-containing flame retardant which can be used for imparting an organic polymer with not only excellent flame retardancy but also high impact strength and high heat resistance.

Another object of the present invention is to provide a method for imparting an organic polymer with flame retardancy, which comprises adding the above-mentioned silicon-containing flame retardant to an organic polymer.

DETAILED DESCRIPTION OF THE INVENTION

Figure 1A:
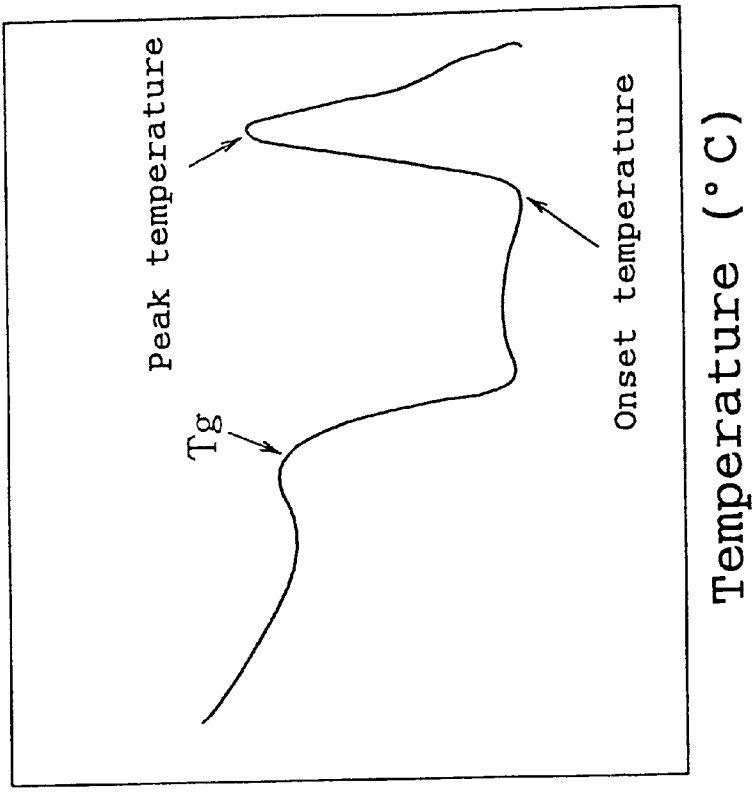
FIGS. 1(a) and 1(b) are differential scanning calorimetry (DSC) charts referred to in the Examples for explaining the methods for determining, by DSC, a glass transition temperature (Tg) and temperatures at the onset of and at the top of the exothermic peak.

In one aspect of the present invention, there is provided a silicon-containing flame retardant for an organic polymer, comprising a monomer, a polymer or a mixture thereof, which is represented by the following formula (1):

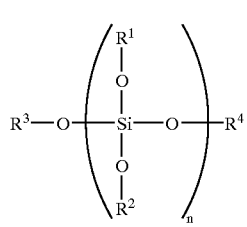

(1)

wherein:
each of $R^1$ and $R^2$ independently represents a monovalent $C_1$–$C_{20}$ hydrocarbon group;
each of $R^3$ and $R^4$ independently represents a monovalent or divalent $C_1$–$C_{20}$ hydrocarbon group, with the proviso that, when each of $R^3$ and $R^4$ independently represents a divalent $C_1$–$C_{20}$ hydrocarbon group, $R^3$ and $R^4$ are bonded to each other to form a ring; and n is 1 or more in terms of the number average n-value, wherein the polymer comprises a plurality of recurring units each represented by the following formula (2):

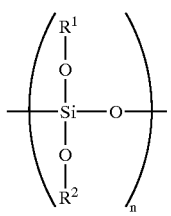

(2)

wherein each of $R^1$ and $R^2$ is as defined for formula (1), and terminal $R^3$ and $R^4$ groups, wherein each of $R^3$ and $R^4$ is as defined for formula (1), the recurring units each represented by formula (2) being the same or different, so that the polymer is a homopolymer or a copolymer, wherein the copolymer has a random, a block or an alternating configuration.

In another aspect of the present invention, there is provided a method for imparting an organic polymer with flame retardancy, which comprises adding to an organic polymer the above-mentioned silicon-containing flame retardant.

Hereinbelow, the present invention is described in detail.

It is important for the flame retardant of the present invention to contain silicon atoms. A silicon atom is an element which has a low surface energy. Therefore, in the shaped article obtained by molding a resin composition comprising an organic polymer and the silicon-containing flame retardant of the present invention, the location of the flame retardant is biased toward the surface portion thereof. As a result, when the shaped article begins to burn, the concentration of the flame retardant in the surface portion of the shaped article becomes high, so that the shaped article exhibits excellent flame retardancy.

When the shaped article satisfies the following formula:

$$2 \leq C^1/C^2 \leq 100$$

wherein $C^1$ (%) represents the average concentration of the silicon atoms in the surface portion of the shaped article of from the surface to the depth of 50 Å (angstrom) (5 nm), as measured by X-ray photoelectron spectroscopy, and $C^2$ (%) represents the average concentration of the silicon atoms in the whole shaped article as measured by X-ray fluorescence analysis, the shaped article exhibits especially excellent flame retardancy.

It is required that the silicon-containing flame retardant of the present invention comprise a monomer, a polymer or a mixture thereof, which has an Si—O—R linkage wherein R is a hydrocarbon group. Generally, when a resin composition containing a silicon-containing flame retardant begins to burn, a reaction occurs to form a film of silica on the surface of the resin composition, and the silica film functions as a heat insulating barrier. It has been found that an Si—O—R linkage is easily susceptible to the silica film-forming reaction, thereby providing high flame retardant activity, as compared to an Si—R linkage.

Further, in the silicon-containing flame retardant of the present invention, the polymer represented by formula (1) is selected from the group consisting of a linear organosilicate and a cyclic organosilicate having a structure in which the linear organosilicate forms a ring. In an organosilicate having a branched or crosslinked structure, the concentration of the pendant Si—O—R group is low and the concentration of the Si—O—Si linkage is high, as compared to those in a linear or cyclic organosilicate. In this connection, for example, it has been found that, when a composition comprising a polycarbonate and an organosilicate begins to burn, the reaction of the carbonate group with the Si—O—R group easily forms a char film, as compared to the reaction of the carbonate group with the Si—O—Si linkage.

In the flame retardant of the present invention, it is preferred that each of $R^1$ and $R^2$ of formulae (1) and (2) independently represents a $C_1$–$C_{20}$ alkyl group or a monovalent $C_6$–$C_{20}$ aromatic group, and each of $R^3$ and $R^4$ of formula (1) independently represents $C_1$–$C_{20}$ alkyl group or a monovalent $C_6$–$C_{20}$ aromatic group or independently represents $C_1$–$C_{20}$ alkylene group or a divalent $C_6$–$C_{20}$ aromatic group, with the proviso that all of $R^1$, $R^2$, $R^3$ and $R^4$ are not simultaneously alkyl groups or monovalent aromatic groups, that when each of $R^1$ and $R^2$ is an alkyl group, both of $R^3$ and $R^4$ are not simultaneously alkylene groups and that when each of $R^1$ and $R^2$ is a monovalent aromatic group, both of $R^3$ and $R^4$ are not simultaneously divalent aromatic groups.

In addition, it is preferred that the flame retardant of the present invention contains at least two types of units selected from the group consisting of the following formulae (3) to (5):

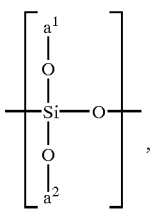

(3)

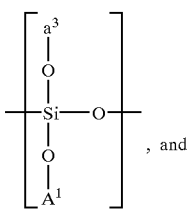

, and (4)

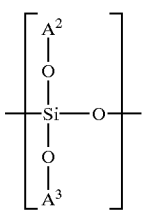

(5)

wherein each of $a^1$, $a^2$ and $a^3$ independently represents a $C_1$–$C_{20}$ alkyl group and each of $A^1$, $A^2$ and $A^3$ independently represents a monovalent $C_6$–$C_{20}$ aromatic group.

When the silicon-containing flame retardant of the present invention contains an aromatic group as any of $R^1$, $R^2$, $R^3$ and $R^4$ in formula (1), it is preferred that the aromatic group is present in an amount of from 10 to 90 mole %, based on the total molar amount of $R^1$, $R^2$, $R^3$ and $R^4$, more advantageously from 10 to 50 mole %.

It is also preferred that each of $R^1$ and $R^2$ in formulae (1) and (2) independently represents a methyl group, a butyl group, a phenyl group or a benzyl group, and that each of $R^3$ and $R^4$ independently represents a methyl group, a butyl group, a phenyl group or a benzyl group or independently represents a methylene group, a butylene group, a phenylene group or a benzylidene group.

When the silicon-containing flame retardant of the present invention contains a phenyl group as any of $R^1$, $R^2$, $R^3$ and $R^4$ in formula (1), from the viewpoint of improving the water resistance, heat stability and compatibility with an aromatic group-containing polymer, it is preferred that the phenyl group is present in an amount of from 10 to 90 mole %, based on the total molar amount of $R^1$, $R^2$, $R^3$ and $R^4$. When the amount of the phenyl group is more than 90 mole %, the compatibility of the silicon-containing flame retardant with an aromatic group-containing polymer becomes too high, so that the silicon-containing flame retardant added to the polymer is homogeneously dispersed into the polymer, so that the concentration of silicon atoms in the surface portion of the resultant composition becomes lowered and hence the flame retardancy of the composition tends to be lowered. On the other hand, when the amount of the phenyl group is less than 10 mole %, the compatibility of the silicon-containing flame retardant with the aromatic group-containing polymer becomes low, so that the silicon-containing flame retardant tends to bleed out.

When the silicon-containing flame retardant is added to a polymer, it is preferred that the difference in solubility parameter value (SP value) between the polymer and the silicon-containing flame retardant, i.e., $\Delta SP$ value, is from 0.5 to 3.0 $[(Cal/cm^3)^{1/2}]$.

In the silicon-containing flame retardant of the present invention, n in formula (1) represents a number average n-value. There is no limitation with respect to the range of the n-value. However, from the viewpoint of improving the flash temperature and hydrolysis resistance of the flame retardant, it is preferred that the n-value is 10 or more, more advantageously 20 or more, most advantageously 100 or more. When n is less than 10, the silicon-containing flame retardant becomes volatile, so that difficulty may occur in the molding process. (It should be noted that in the Examples described below, an n-value which originally contains a fraction of less than 1 has been rounded by counting a fraction of 0.5 or more as a unity and cutting off a fraction of less than 0.5.)

Examples of compounds used as the silico-containing flame retardant of the present invention include orthosilicic esters, hydrolysis and dehydration-condensation products of orthosilicic esters, organoalkoxypolysiloxanes, organoaryloxypolysiloxanes and the like.

There is no particular limitation with respect to the range of the molecular weight of the silicon-containing flame retardant of the present invention. However, it is preferred that the silicon-containing flame retardant has a weight average molecular weight of from 1,000 to 1,000,000 as measured by gel permeation chromatography (GPC) using a calibration curve obtained with respect to standard monodispersed polystyrene systems.

When the silicon-containing flame retardant of the present invention comprises a mixture of a monomer and a polymer each represented by formula (1), from the viewpoint of lowering the volatility of the flame retardant, it is preferred that the amount of the above-mentioned monomer is 1% by weight or less, based on the weight of the above-mentioned mixture.

The temperature at which the silicon-containing flame retardant exhibits a 1% weight loss is taken as an index of the heat stability of the silicon-containing flame retardant. It is preferred that the temperature at which the silicon-containing flame retardant of the present invention exhibits a 1% weight loss is 100° C. or more, more advantageously 200° C. or more, as measured by a heating test in which the flame retardant is placed in an atmosphere of nitrogen gas and the temperature of the atmosphere is elevated to 100° C, or more at a temperature elevation rate of 40° C. per minute.

There is no limitation with respect to the color of the silicon-containing flame retardant of the present invention. However, it is preferred that the silicon-containing flame retardant of the present invention has a color number (APHA) of 20 or less as measured in accordance with JIS-K0101.

The organosilicate of formula (1) (i.e., the silicon-containing flame retardant of the present invention) can be produced by the partial hydrolysis and dehydration-condensation reaction of a silane compound, such as tetraalkoxysilane or tetraaryloxysilane, and the n-value can be adjusted by controlling the degree of hydrolysis.

The silane compound (such as a tetraalkoxysilane, and a tetraaryloxysilane) is produced by the reaction of silicon with an alcohol, the reaction of a silicon halide with an alcohol or a transesterification reaction of an alkoxysilane or aryloxysilane with an alcohol.

It is preferred that the partial hydrolysis and dehydration-condensation reaction of the silane compound (such as a tetraalkoxysilane and a teraaryloxysilane) is conducted by adding, to the above-mentioned silane compound, water, wherein water is used in an amount which is from 0.85 to 1.2 times the equivalent of the silane compound. If desired, the reaction may be conducted in the presence of a catalyst. Examples of catalysts include an inorganic acid, such as hydrochloric acid, sulfuric acid, nitric acid and phosphoric acid, and an organic acid, such as a carboxylic acid and a sulfonic acid. Among these catalysts, hydrochloric acid is preferred because it can be easily removed by distillation after completion of the reaction. When hydrochloric acid is used as a catalyst, the amount of hydrochloric acid is usually from $1\times10^{-6}$ to $1\times10^{-1}$ mole, preferably from $1\times10^{-5}$ to $1\times10^{-2}$ mole in terms of the molar amount of HCl per mole of the silane compound (such as a tetraalkoxysilane and a tetraaryloxysilane).

The reaction may be conducted in the presence of a solvent. It is most preferred that an alcohol generated by the above-mentioned hydrolysis is used as the solvent. The amount of the solvent is usually from 0.1 to 10 parts by weight, preferably from 0.1 to 1.5 parts by weight, relative to 1 part by weight of the silane compound (such as a tetraalkoxysilane and a tetraaryloxysilane). In the above-mentioned partial hydrolysis and dehydration-condensation reaction of the silane compound, if desired, the addition of a predetermined amount of water to the reaction system may be conducted under stirring. The hydrolysis and dehydration-condensation reaction is conducted under reflux while heating or elevating the temperature. The reflux is conducted at a temperature which is approximately the same as the boiling point of the solvent. The reaction time (the time for reflux) varies depending on the type of the catalyst used. Generally, the reaction time is from 0.5 to 10 hours, advantageously from 2 to 5 hours.

After completion of the partial hydrolysis and dehydration-condensation reaction, an alcohol generated by the reaction is distilled off. The distillation can be conducted using any of various conventional methods for distillation or evaporation. Specifically, there can be mentioned a method in which the alcohol is distilled off under conditions wherein the temperature is the same as or higher than the boiling point of the alcohol and the pressure is atmospheric pressure or reduced pressure, and a method in which the alcohol is subjected to distillation under atmospheric pressure or reduced pressure and at a temperature lower than the boiling point of the alcohol, while introducing an inert gas, such as nitrogen, carbon dioxide, argon or helium, thereby causing the alcohol to be distilled off together with the inert gas. When the above-mentioned partial hydrolysis and dehydration-condensation reaction of the silane compound is conducted on a commercial scale, a method is suitable in which the alcohol is distilled off while heating the reaction mixture under conditions wherein the temperature is from 80 to 200° C., more advantageously from 120 to 180° C., and the pressure is atmospheric pressure. In a preferred mode of this commercially suitable method, the temperature is elevated to the above-mentioned range and maintained for 0.5 to 10 hours, more advantageously for 1 to 5 hours, so as to complete the reaction. By this preferred mode of the method, a large amount of a uniform reaction product can be efficiently obtained.

It is preferred that the content of each of a generated alcohol and an unreacted silane compound (such as a tetraalkoxysilane and a tetraaryloxysilane) remaining in the thus obtained reaction product is 1% by weight or less.

The removal of the remaining alcohol can be conducted by a method in which the alcohol is subjected to a condensation reaction or a transesterification reaction in which the OH group is converted to an alkoxy group or an aryloxy group.

The removal of the remaining silane compound can be conducted by various conventional methods for distillation or evaporation, i.e., by the same methods as used for distilling off a solvent. Specifically, as methods which can be most conveniently practiced, there can be mentioned a method in which the monomer (i.e., the silane compound) is distilled off under conditions wherein the temperature is the same as or higher than the boiling point of the monomer and the pressure is atmospheric pressure or reduced pressure, and a method in which the monomer is subjected to distillation under atmospheric pressure or reduced pressure and at a temperature lower than the boiling point of the monomer, while introducing an inert gas, such as nitrogen, carbon dioxide, argon or helium, thereby causing the monomer to be distilled off together with the inert gas. The temperature used in these methods is usually from 100 to 250° C., more advantageously from 120 to 200° C.

With respect to the silicon-containing flame retardant of the present invention, when each of $R^1$ and $R^2$ of formulae (1) and (2) independently represents a $C_1$–$C_{20}$ alkyl group or a monovalent $C_6$–$C_{20}$ aromatic group, and each of $R^3$ and $R^4$ of formula (1) independently represents a $C_1$–$C_{20}$ alkyl group or a monovalent $C_6$–$C_{20}$ aromatic group or independently represents a $C_1$–$C_{20}$ alkylene group or a divalent $C_6$–$C_{20}$ aromatic group, wherein at least one of $R^1$, $R^2$, $R^3$ and $R^4$ is an aromatic group, the silicon-containing flame retardant of the present invention has various further uses in addition to the use as a flame retardant. Examples of further uses include a surface modifier which is used for improving the surface properties (such as scratch resistance, light stability, weatherability, lubricity, slidability, antistatic properties and the like) of a resin, a metal, a glass and the like; a coating modifier which is added to a coating material for improving the properties of the coating; an adhesive; as a viscosity controlling agent; and a agent for imparting a special function, such as, a heat wave absorber and the like.

With respect to the method of the present invention for imparting a flame retardancy to an organic polymer, examples of organic polymers (hereinafter, frequently referred to as "polymer (B)") to which the silicon-containing flame retardant of the present invention (hereinafter, frequently referred to as "silicon-containing flame retardant (A)") can be added include rubber polymers, thermoplastic resins, thermosetting resins and the like. Among these resins, especially preferred are thermoplastic resins.

When silicon-containing flame retardant (A) is added to polymer (B), it is preferred that the amount of silicon-containing flame retardant (A) is from 0.01 to 100 parts by weight, more advantageously from 1 to 50 parts by weight, most advantageously from 1 to 20 parts by weight, relative to 100 parts by weight of polymer (B).

With respect to a rubber polymer which is an example of polymer (B), it is preferred that the rubber polymer has a glass transition temperature (Tg) of –30° C. or lower. If the rubber polymer has a glass transition temperature higher than –30° C., the improvement in the impact resistance may be unsatisfactory in some cases. (With respect to the method for measuring the Tg of the rubber polymer, reference can be made to FIG. 1(a), and to the explanation on the method, made in the section concerning measuring methods in the item "BEST MODE FOR CARRYING OUT THE INVENTION" described below).

Examples of suitable rubber polymers include diene rubbers, such as polybutadiene, poly(styrene-butadiene) and poly(acrylonitrile-butadiene); saturated rubbers obtained by hydrogenating the diene rubbers mentioned above; an isoprene rubber; a chloroprene rubber; acrylic rubbers, such as polybutyl acrylate; an ethylene/propylene copolymer rubber; an ethylene/propylene/diene terpolymer (EPDM); and an ethylene/octene copolymer rubber (each in the form of a crosslinked or non-crosslinked rubber), and thermoplastic elastomers containing at least one of the rubber polymers enumerated above.

As the above-mentioned thermoplastic elastomers, especially preferred is a thermoplastic, styrene polymer elastomer. Examples of such thermoplastic, styrene polymer elastomers include a block copolymer comprised of aromatic vinyl monomer units and conjugated diene monomer units and a hydrogenated or epoxidated block copolymer obtained by partially hydrogenating or partially epoxidating the conjugated diene moiety of the above block copolymer.

Examples of aromatic vinyl monomers usable for producing the above-mentioned block copolymer include styrene, α-methylstyrene, p-methylstyrene, p-chlorostyrene, p-bromostyrene, 2,4,5-tribromostyrene and the like. Styrene is most preferred, but styrene may be copolymerized with other aromatic vinyl monomers mentioned above.

As examples of conjugated diene monomers usable for forming conjugated diene monomer units in the above-mentioned block copolymer, 1,3-butadiene, isoprene and the like can be mentioned.

With respect to the block configuration of the above-mentioned block copolymer, the block copolymer is preferably a linear block copolymer having a configuration of, for example, SB, $S(BS)_n$ (wherein n represents an integer of from 1 to 3) or $S(BSB)_n$ (wherein n represents an integer of 1 or 2), or a star-shaped block copolymer having a configuration of $(SB)_nX$, wherein the B moieties form a linkage center portion. In $(SB)_nX$, n represents an integer of from 3 to 6. In the above configurations, S represents a polymer block comprised of aromatic vinyl monomer units, B represents a polymer block comprised of conjugated diene monomer units and/or a partial hydrogenation product thereof, X represents a coupling agent residue (e.g., silicon tetrachloride, tin tetrachloride, or a polyepoxy compound).

Among them, linear block copolymers having a diblock configuration "SB", a triblock configuration "SBS", and a tetrablock configuration "SBSB" are preferred.

There is no particular limitation with respect to the thermoplastic resin which is an example of polymer (B) usable in combination with silicon-containing flame retardant (A) of the present invention, as long as the thermoplastic resin is compatible with silicon-containing flame retardant (A) or the thermoplastic resin and silicon-containing flame retardant (A) of the present invention are mutually, homogeneously dispersible. Examples of such thermoplastic resins include styrene polymers, polyphenylene ethers, olefin polymers, vinyl chloride polymers, polyamides, polyesters, polyphenylene sulfides, polycarbonates and polymethacrylates. These thermoplastic resins can be used individually or in combination. It is preferred to use at least one thermoplastic resin selected from the group consisting of polyphenylene ethers, styrene polymers and polycarbonates, more advantageously polycarbonates.

An aromatic polycarbonate, which is one of the above-mentioned thermoplastic resins, is selected from aromatic homopolycarbonates and aromatic copolycarbonates.

Examples of methods for producing aromatic polycarbonates include a phosgene method in which phosgene is blown into a bifunctional phenolic compound in the presence of caustic alkali and a solvent, and a transesterification method in which, for example, a bifunctional phenolic compound and diethyl carbonate are subjected to transesterification in the presence of a catalyst.

A preferred range of the viscosity average molecular weight of the aromatic polycarbonate is from 10,000 to 100,000.

Examples of bifunctional phenolic compounds include 2,2'-bis(4-hydroxyphenyl)propane, 2,2'-bis(4-hydroxy-3,5-dimethylphenyl)propane, bis(4-hydroxyphenyl)methane, 1,1'-bis(4-hydroxyphenyl)ethane, 2,2'-bis(4-hydroxyphenyl)butane, 2,2'-bis(4-hydroxy-3,5-diphenyl)butane, 2,2'-bis(4-hydroxy-3,5-dipropylphenyl)propane, 1,1'-bis(4-hydroxyphenyl)cyclohexane, and 1-phenyl-1,1'-bis(4-hydroxyphenyl)ethane. 2,2'-bis(4-hydroxyphenyl)propane (i.e., bisphenol A) is particularly preferred. In the present invention, bifunctional phenolic compounds can be used individually or in combination.

As an example of polymer (B) usable in combination with silicon-containing flame retardant (A) of the present invention, there can be mentioned a styrene polymer. A styrene polymer is a rubber-modified styrene polymer and/or a non-rubber-modified styrene polymer, preferably a rubber-modified styrene polymer or a mixture of a rubber-modified styrene polymer and a non-rubber-modified styrene polymer. With respect to the styrene polymer, there is no particular limitation, as long as the styrene polymer is compatible with silicon-containing flame retardant (A) or the styrene polymer and silicon-containing flame retardant (A) are mutually, homogeneously dispersible.

A rubber-modified styrene polymer is a polymer having a structure in which a dispersion phase comprised of a particulate rubber polymer is dispersed in a continuous phase comprised of an aromatic vinyl polymer. A rubber-modified styrene polymer can be obtained by graft-polymerizing an aromatic vinyl monomer and optionally a vinyl comonomer copolymerizable with the aromatic vinyl monomer, on a rubber polymer, using a customary method, such as a bulk polymerization method, an emulsion polymerization method or a suspension polymerization method.

Examples of rubber-modified styrene polymers include the so-called high impact polystyrene (hereinafter, frequently referred to as "HIPS"), ABS polymer (acrylonitrile/butadiene/styrene copolymer), AAS polymer (acrylonitrile/acrylic rubber/styrene copolymer), AES polymer (acrylonitrile/ethylene-propylene rubber/styrene copolymer) and the like.

With respect to the above-mentioned rubber polymer which is used in the production of a rubber-modified styrene polymer, it is preferred that the rubber polymer has a glass transition temperature (Tg) of −30° C. or lower. If the rubber polymer has a glass transition temperature higher than −30° C., the improvement in impact resistance may be unsatisfactory in some cases.

Examples of suitable rubber polymers include diene rubbers, such as polybutadiene, poly(styrene-butadiene) and poly(acrylonitrile-butadiene); saturated rubbers obtained by hydrogenating the diene rubbers mentioned above; an isoprene rubber; a chloroprene rubber; acrylic rubbers, such as polybutyl acrylate; an ethylene/propylene copolymer rubber; an ethylene/propylene/diene terpolymer (EPDM); and an ethylene/octene copolymer rubber. Diene rubbers are particularly preferred.

Preferred examples of aromatic vinyl monomers which are graft-polymerizable with the rubber polymer include styrene, α-methylstyrene and p-methylstyrene. Styrene is most preferred, but styrene can be used for copolymerization in combination with other aromatic vinyl monomers mentioned above.

If desired, at least one comonomer copolymerizable with the aromatic vinyl monomer can be introduced into the rubber-modified styrene polymer. For obtaining a rubber-modified styrene copolymer having excellent oil resistance, as a comonomer copolymerizable with the aromatic vinyl monomer, an unsaturated nitrile monomer, such as acrylonitrile or methacrylonitrile, can be used. Also, for lowering the melt viscosity of the aromatic vinyl monomer, an acrylate comonomer having an alkyl group having 1 to 8 carbon atoms can be used as a comonomer. Further, for improving the heat resistance of a final resin composition, other comonomers, such as α-methylstyrene, acrylic acid, methacrylic acid, maleic anhydride and N-substituted maleimide or the like, can be used as a comonomer.

When the aromatic vinyl monomer is used in the form of a mixture with a comonomer copolymerizable therewith, the amount of the comonomer in the mixture (to be graft-polymerized on the rubber polymer) is generally in the range of from 0 to 40% by weight.

In the present invention, the content of the rubber component in the rubber-modified styrene polymer is preferably in the range of from 5 to 80% by weight, more preferably from 10 to 50% by weight. The content of the styrene polymer component in the rubber-modified styrene polymer is preferably in the range of from 95 to 20% by weight, more preferably from 90 to 50% by weight. When the ratio of the rubber polymer to the styrene polymer component in the rubber-modified styrene polymer is within the above-mentioned range, a good balance of impact resistance and stiffness can be achieved with respect to an ultimate shaped article. The average diameter of the rubber particles in the rubber-modified-styrene polymer is preferably from 0.1 to 5.0 μm, more preferably from 0.2 to 3.0 μm. When the average rubber particle diameter is within the above-mentioned range, the impact resistance of the shaped article (obtained by molding the resin composition of the present invention) is particularly enhanced.

With respect to the rubber-modified styrene polymer, the reduced viscosity $\eta_{sp}/C$ (as measured in a 0.5 g/dl solution at 30° C.), which is a yardstick of the molecular weight, is preferably in the range of from 0.30 to 0.80 dl/g, more preferably from 0.40 to 0.60 dl/g, wherein, when the polymer matrix is a polystyrene resin, toluene is used as the solvent and, when the polymer matrix is an unsaturated nitrile/aromatic vinyl copolymer, methyl ethyl ketone is used as the solvent. In the production of the rubber-modified styrene polymer, the reduced viscosity $\eta_{sp}/C$ can be controlled by selecting the type and amount of the initiator, the polymerization temperature and the amount of the chain transfer agent.

When it is especially desired to achieve an excellent heat resistance and an excellent oil resistance, it is preferred that the above-mentioned styrene polymer used as polymer (B) is a syndiotactic styrene polymer, which is a crystalline styrene polymer. As compared to an ordinary, atactic styrene polymer which is amorphous, a syndiotactic styrene polymer has excellent heat resistance and chemical resistance. However, a syndiotactic styrene polymer is brittle and has poor impact resistance. The term "syndiotactic styrene polymer" means a styrene polymer having a syndiotactic stereochemical structure, i.e., a stereochemical structure wherein, in the main chain formed by carbon-carbon bonds, the orientations of the pendant phenyl groups are alternating. The tacticity is determined by a nuclear magnetic resonance method in which a carbon isotope $^{13}C$ is detected ($^{13}C$-NMR method).

Examples of styrene polymers include polystyrene, poly(alkylstyrene), poly(halogenated styrene), poly(alkoxystyrene), poly(vinylbenzoic acid) and mixtures thereof, and copolymers containing the above aromatic vinyl monomers as main components. Examples of poly(alkylstyrene) include poly(methylstyrene), poly(ethylstyrene), poly(isopropylstyrene), poly(tertiary butylstyrene) and the like. Examples of poly(halogenated styrene) include poly(chlorostyrene), poly(bromostyrene), poly(fluorostyrene) and the like. Examples of poly(alkoxystyrene) include poly(methoxystyrene), poly(ethoxystyrene) and the like. Especially preferred are polystyrene, poly(p-methylstyrene), poly(m-methylstyrene), poly(p-tertiary butylstyrene), poly(p-chrolostyrene), poly(m-chrolostyrene), poly(p-fluorostyrene) and a copolymer of styrene and p-methyl-styrene.

As a preferred example of a polymer mixture which can be used in the present invention as polymer (B) in combination with silicon-containing flame retardant (A), there can be mentioned a polymer mixture of an aromatic polycarbonate and a styrene polymer, wherein the polymer mixture has an aromatic polycarbonate content of from 1 to 99% by weight, more advantageously from 33 to 99% by weight, more advantageously from 50 to 90% by weight, most advantageously from 60 to 90% by weight.

With respect to the polymer mixture of an aromatic polycarbonate and a styrene polymer, it is preferred that the styrene polymer comprises a HIPS (high impact polystyrene) and/or an ABS (acrylonitrile-butadiene-styrene copolymer) resin. When a HIPS is used as a styrene polymer, from the viewpoint of improving the compatibility of the HIPS with an aromatic polycarbonate, it is preferred that a styrene copolymer is used as a compatibility agent. For example, it is preferred that the styrene copolymer described in WO 95-35346 is used as such a compatibility agent. Specifically, it is preferred that use is made of at least one compatibility agent selected from the group consisting of (a) a copolymer comprising an aromatic vinyl monomer and a comonomer copolymerizable with the aromatic vinyl monomer; and (b) a graft copolymer comprising a rubber polymer having a glass transition temperature (Tg) of −30° C. or lower and, grafted thereon, an aromatic vinyl monomer (1) and a monomer (2) copolymerizable with the aromatic vinyl monomer (1). In the graft copolymer (b), each of monomers (1) and (2) may be either individually homopolymerized or copolymerized with each other. Further, each of the above-mentioned specific copolymers (a) and (b) as compatibility agents has a non-uniform distribution with respect to proportions of component monomers constituting the copolymer, so that each of copolymers (a) and (b) comprises copolymer molecules having different solubility parameter (SP) values, wherein the difference in SP value (ΔSP value) between the copolymer molecule having a maximum SP value and the copolymer molecule having a minimum SP value is from 0.3 to 1.0 $[(cal/cm^3)^{1/2}]$, and wherein each of copolymers (a) and (b) has an average SP value of from 10.6 to 11.2 $[(cal/cm^3)^{1/2}]$.

Specific examples of polyphenylene ethers (hereinbelow, frequently referred to as "PPE"), which can be used as polymer (B) in combination with silicon-containing flame retardant (A) of the present invention, include poly-(2,6-dimethyl-1,4-phenylene ether), and a copolymer of 2,6-dimethylphenol and 2,3,6-trimethylphenol. Of these, poly(2,6-dimethyl-1,4-phenylene ether) is preferred. The method for producing such a PPE is not particularly limited. For example, the PPE can be readily produced by the method described in U.S. Pat. No. 3,306,874, in which, for example, 2,6-xylenol is subjected to oxidative polymerization using as a catalyst a complex of copper (I) salt and an amine. Further, the PPE can also be readily produced by other methods described, for example, in U.S. Pat. Nos. 3,306,875, 3,257,357, 3,257,358, Examined Japanese Patent Application Publication No. 52-17880, and Unexamined Japanese Patent Application Laid-Open Specification No. 50-51197. The reduced viscosity $\eta_{sp}/C$ (as measured in a 0.5 g/dl chloroform solution at 30° C.) of the PPE used in the present invention is preferably in the range of from 0.20 to 0.70 dl/g, more preferably from 0.30 to 0.60 dl/g. As a method for achieving the above-mentioned range of reduced viscosity of the PPE, there can be mentioned a method in which the amount of a catalyst used in the production of the PPE is appropriately chosen.

As another example of the polymer mixtures which can be preferably used in the present invention as polymer (B) in combination with silicon-containing flame retardant (A), there can be mentioned a mixture of a styrene polymer and a PPE, which has a styrene polymer content of from 1 to 99% by weight, preferably from 33 to 99% by weight, more preferably from 50 to 90% by weight, most preferably from 60 to 90% by weight.

As a further example of the polymer mixtures which can be preferably used in the present invention as polymer (B) in combination with silicon-containing flame retardant (A), there can be mentioned a mixture of an aromatic polycarbonate and a rubber polymer (especially, a mixture of an aromatic polycarbonate and a styrene polymer which is a thermoplastic elastomer is preferred), which has an aromatic polycarbonate content of from 1 to 99% by weight, preferably from 30 to 99% by weight, more preferably from 50 to 95% by weight, most preferably from 70 to 95% by weight. By the addition of the above-mentioned thermoplastic elastomer to an aromatic polycarbonate, it becomes possible to solve a problem (accompanying the use of the aromatic polycarbonate) that a large-thickness shaped article produced from the aromatic polycarbonate is likely to have a low impact strength. Further, when the above-mentioned styrene copolymer described in WO 95-35346 is added as a compatibility agent to the mixture of the aromatic polycarbonate and the thermoplastic elastomer, a further improved impact strength can be achieved.

When silicon-containing flame retardant (A) of the present invention is added to polymer (B), if desired, one or more flame retardants other than silicon-containing flame retardant (A) (hereinbelow, frequently referred to simply as "flame retardant (C)") may be added as an auxiliary flame retardant. Examples of flame retardant (C) include an organosilicate other than the organosilicate represented by formula (1) above, a metal salt flame retardant, a halogen-containing flame retardant, a phosphorus-containing flame retardant, an inorganic flame retardant, a triazine skeleton-containing compound, a silicone resin, a silicone oil, silica, an aramid fiber, a polyacrylonitrile fiber, a fluororesin and a novolak resin.

Examples of organosilicates (usable as flame retardant (C)) other than the organosilicate represented by formula (1) above include:

an organosilicate having a structure in which $R^1$ and $R^2$ in formula (1) above are replaced by side chains, Si—O—R and Si—O—R , respectively, wherein each of R and R' independently represents a $C_1$–$C_{20}$ alkyl group or a $C_6$–$C_{20}$ aromatic group (e.g., an organotrialkoxypolysiloxane and an organotriaryloxypolysiloxane); and a branched or crosslinked organosilicate having a structure in which $R^1$ and $R^2$ in formula (1) are replaced by side chains, such as Si—O—Si.

Examples of metal salt flame retardants usable as flame retardant (C) include metal salts of organic sulfonic acids, such as potassium trichlorobenzenesulfonate, potassium perfluorobutanesulfonate, and potassium diphenylsulfone-3-sulfonate; metal salts of aromatic sulfonimides; and metal salt-containing aromatic organic polymers having a structure in which a metal salt of sulfonic acid, sulfuric acid, phosphoric acid or boric acid is bonded to an aromatic ring of an aromatic organic polymer, such as a styrene polymer or a polyphenylene ether. As an example of metal salt-containing aromatic organic polymers, there can be mentioned an alkali metal salt of a polystyrenesulfonic acid. The use of these metal salt flame retardants as flame retardant (C) is advantageous especially when a polycarbonate is used as polymer (B). This is because when a shaped article obtained by molding a resin composition comprising a polycarbonate and a metal salt flame retardant begins to burn, the metal salt flame retardant accelerates a decarboxylation reaction, thereby improving the flame retardancy. The use of the alkali metal salt of a polystyrenesulfonic acid as flame retardant (C) is advantageous in that when a shaped article obtained by molding the resin composition containing the alkali metal salt of a polystyrene sulfonate begins to burn, the sulfonic acid metal salt functions as a crosslinking reaction site, thereby greatly contributing to the formation of a carbonization product film.

Examples of halogen-containing flame retardants usable as flame retardants (C) include a bisphenol halide, an aromatic halide, a polycarbonate halide, an aromatic vinyl polymer halide, a cyanurate halide-containing resin and a polyphenylene ether halide. Specifically, preferred are decabromodiphenyloxide, tetrabromobisphenol A, an oligomer of tetrabromobisphenol A, a bisphenol bromide-containing phenoxy resin, a bisphenol bromide-containing polycarbonate, polystyrene bromide, crosslinked polystyrene bromide, polyphenylene oxide bromide, polydibromophenylene oxide, a condensation product of decabromodiphenyloxide and a bisphenol, a halogen-containing phosphate, a fluororesin and the like.

Examples of phosphorus-containing flame retardants usable as flame retardant (C) include an organic phosphorus compound, red phosphorus, an inorganic phosphate and the like.

Examples of organic phosphorus compounds include a phosphine, a phosphine oxide, a bisphosphine, a phosphonium salt, a phosphinic acid salt, a phosphoric ester and a phosphorous ester. More specific examples of organic phosphorus compounds include triphenyl phosphate, methylneopentyl phosphate, pentaerythritol diethyl diphosphite, methyl neopentyl phosphonate, phenyl neopentyl phosphate, pentaerythritol diphenyldiphosphate, dicyclopentyl hypodiphosphate, dineopentyl hypophosphate, phenylpyrocatechol phosphate, ethylpyrocatechol phosphate and dipyrocatechol hypodiphosphate.

With respect to the organic phosphorus compound, it is preferred to use a monomeric aromatic phosphoric ester and an oligomeric aromatic phosphoric ester.

With respect to the above-mentioned monomeric aromatic phosphoric ester, especially preferred is a hydroxyl group-containing monomeric aromatic phosphoric ester described in U.S. Pat. No. 5,278,212, such as those monomeric aromatic phosphoric esters which are obtained by introducing at least one phenolic hydroxyl group into tricresylphosphate or triphenyl phosphate. Also preferred is a monomeric aromatic phosphoric ester containing a long chain alkyl group, described in International Patent Application Publication No. WO 96-27637, such as tris(nonylphenyl) phosphate.

With respect to the above-mentioned oligomeric aromatic phosphoric esters, preferred are bisphenol A bis(diphenylphosphate), bisphenol A bis(dicresylphosphate), resorcinol bis(diphenylphosphate) and the like.

The oligomeric aromatic phosphoric ester produced by a method disclosed in Unexamined Japanese Patent Applacation Laid-Open Specification No. 5-1079 is also preferred as the above-mentioned organic phosphorus compound. As an example of such a compound usable as a phosphorus-containing flame retardant, there can be mentioned an oligomeric aromatic phosphoric ester obtained by a method in which a 2,6-disubstituted monofunctional phenol is reacted with a phosphorus oxyhalide in the presence of a Lewis acid catalyst to obtain a diarylphosphoro halide and, then, the obtained diarylphosphoro halide is reacted with a bifunctional phenol in the presence of a Lewis acid catalyst.

Examples of red phosphorus used as the phosphorus-containing flame retardant include not only an ordinary red phosphorus but also a red phosphorus product wherein red phosphorus is coated with a film of at least one metal hydroxide selected from the group consisting of aluminum hydroxide, magnesium hydroxide, zinc hydroxide and titanium hydroxide. As another red phosphorus product, there can be mentioned those which are obtained by coating red phosphorus with a film composed of a mixture of a metal hydroxide (selected from the group consisting of aluminum hydroxide, magnesium hydroxide, zinc hydroxide and titanium hydroxide) and a thermosetting resin. As still another red phosphorus product, there can be mentioned those which are obtained by coating red phosphorus with a double-film layer comprising an inner film composed of a metal hydroxide (selected from the group consisting of aluminum hydroxide, magnesium hydroxide, zinc hydroxide and titanium hydroxide) and an outer film composed of a thermosetting resin.

A representative example of inorganic phosphates used as the phosphorus-containing flame retardant is ammonium polyphosphate.

Examples of inorganic flame retardants as flame retardant (C) include aluminum hydroxide, magnesium hydroxide, dolomite, hydrotalcite, calcium hydroxide, barium hydroxide, basic magnesium carbonate, zirconium hydroxide, a hydrate of an inorganic metal compound (such as tin oxide hydrate), a metal oxide (such as aluminum oxide, iron oxide, titanium oxide, manganese oxide, magnesium oxide, zirconium oxide, zinc oxide, molybdenum oxide, cobalt oxide, bismuth oxide, chromium oxide, tin oxide, antimony oxide, nickel oxide, copper oxide and tungsten oxide), a metal powder (selected from, for example, powders of aluminum, iron, titanium, manganese, zinc, molybdenum, cobalt, bismuth, chromium, nickel, copper, tungsten, tin and antimony), zinc borate, zinc metaborate, barium metaborate, zinc carbonate, magnesium carbonate, calcium carbonate, barium carbonate and the like. These substances can be used individually or in combination. Of these, as an inorganic flame retardant which can not only impart an excellent flame retardancy but is also economically advantageous, there can be mentioned at least one compound selected from the group consisting of magnesium hydroxide, aluminum hydroxide, basic magnesium carbonate and hydrotalcite.

Figure 1B:
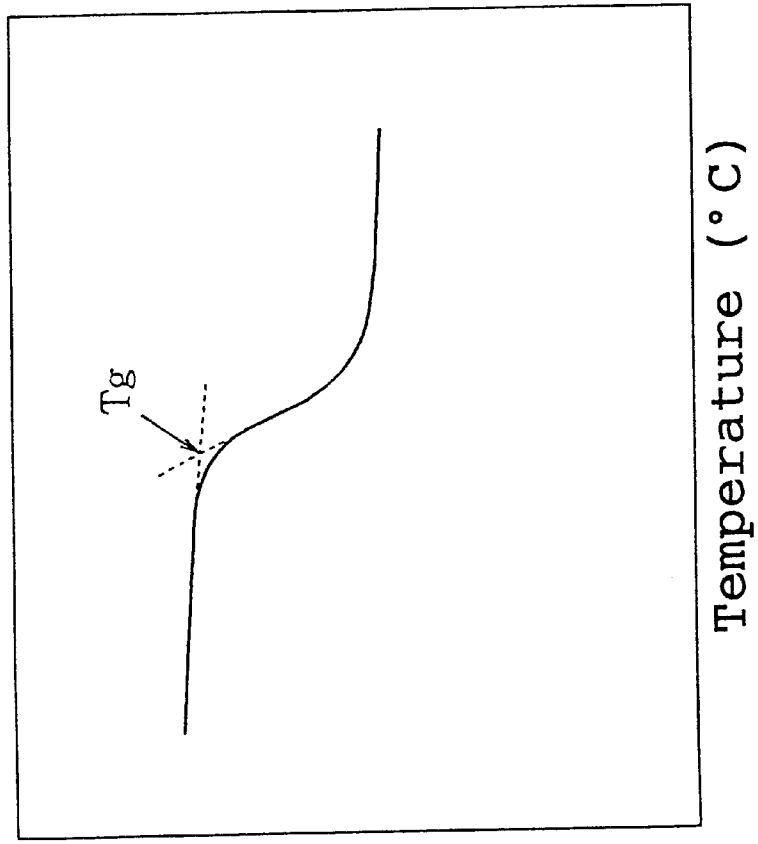
Figure 2:
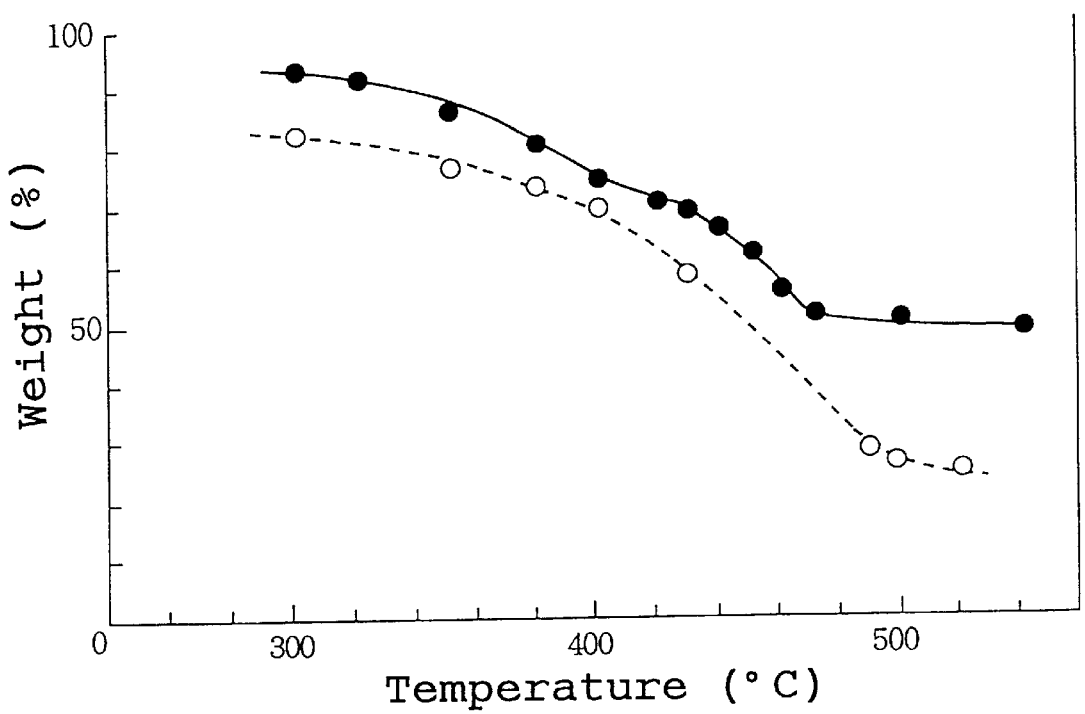
FIG. 2(a) is a graph showing a pyrolytic behavior of a silicate-containing molding material obtained by compression molding in Example 2 (i.e., a composition comprising a polyphenylene ether (PPE), a flame retardant other than an organosilicate, namely 1,3-phenylenebis (diphenylphosphate) (FP), and a silicate (FR1) (weight ratio: 1/1/1)), wherein the pyrolytic behavior is measured by thermogravimetric analysis method (TGA method)
FIG. 2(b) is a graph showing a pyrolytic behavior of a silicate-containing molding material obtained by compression molding in Example 1 (i.e., a composition comprising a polyphenylene ether (PPE) and silicate (FR1) (weight ratio: 1/1), wherein the pyrolytic behavior is measured by thermogravimetric analysis method (TGA method) (in FIGS. 2(a) and 2(B), open circles "○" designate values calculated from the TGA data of the components of the composition, based on the additivity of the TGA data, in which the calculations are conducted on the assumption that there is no interaction among the components of the composition, and solid circles "●" designate values which have been actually found)
Figure 2:
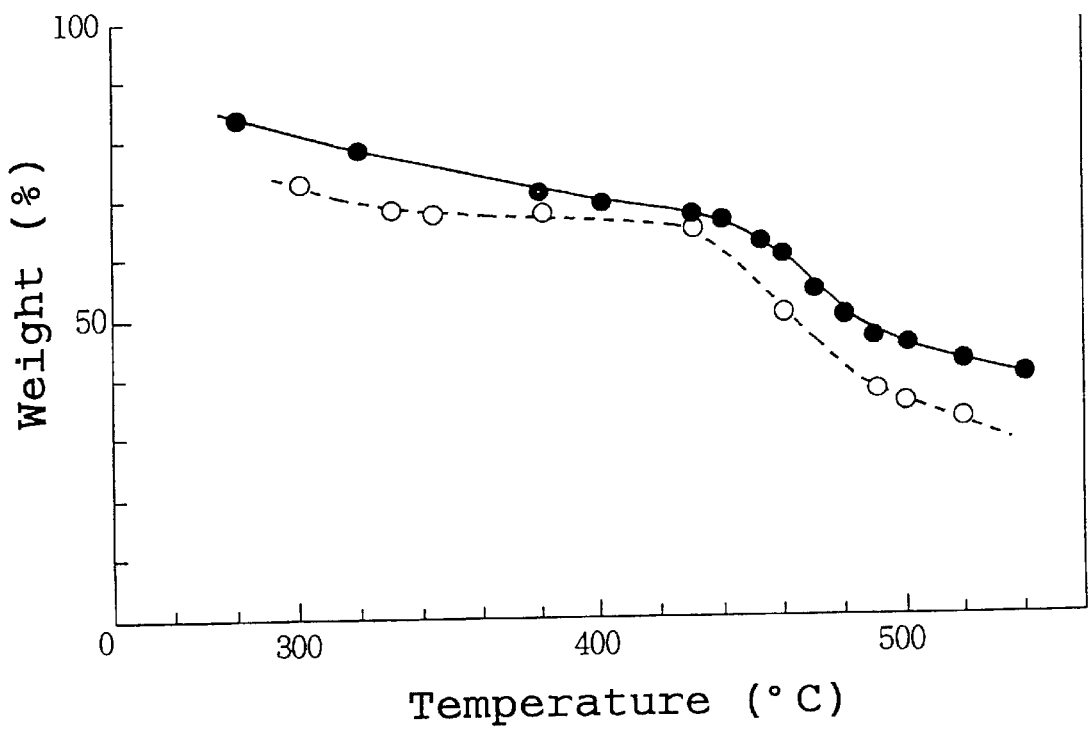
Figure 3A:
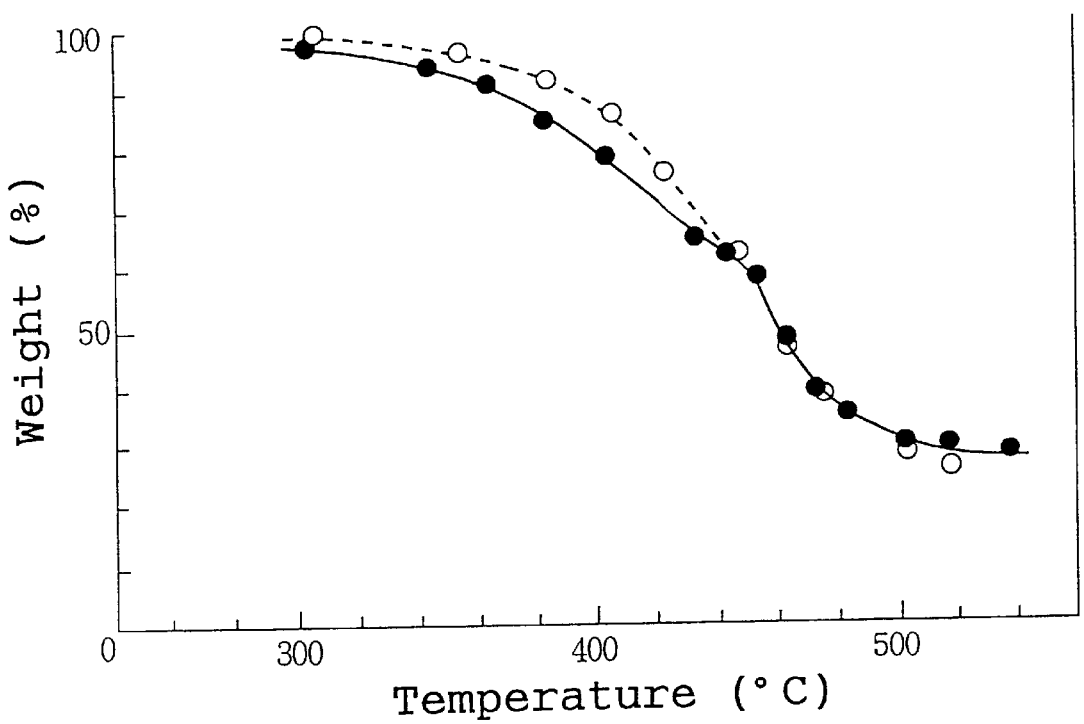
FIG. 3(a) is a graph showing a pyrolytic behavior of a silicate-containing molding material obtained by compression molding in Comparative Example 2 (i.e., a composition comprising a polyphenylene ether (PPE), a flame retardant other than an organosilicate, namely 1,3-phenylenebis (diphenylphosphate) (FP), and a silicate (fr3) (weight ratio: 1/1/1), wherein the pyrolytic behavior is measured by thermogravimetric analysis method (TGA method)
Figure 3B:
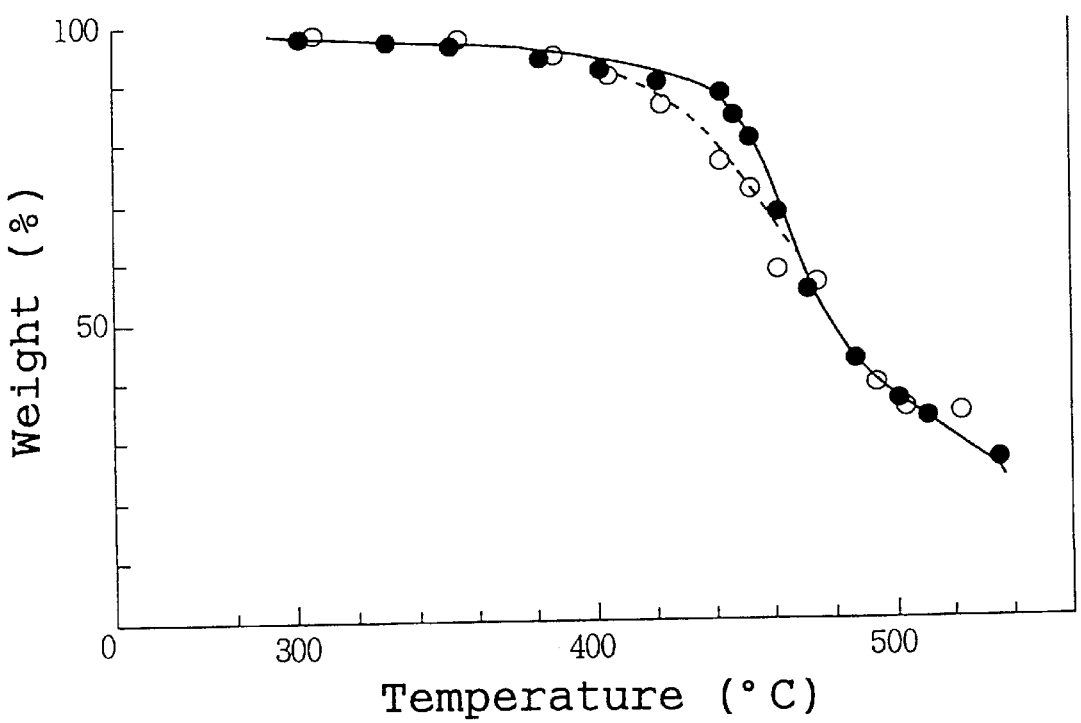
FIG. 3(b) is a graph showing a pyrolytic behavior of a silicate-containing molding material obtained by compression molding in Comparative Example 1 (i.e., a composition comprising a polyphenylene ether (PPE) and silicate (fr3) (weight ratio: 1/1), wherein the pyrolytic behavior is measured by thermogravimetric analysis method (TGA method) (in FIGS. 3(a) and 3(B), open circles "○" designate values calculated from the TGA data of the components of the composition, based on the additivity of the TGA data, in which the calculation is conducted on the assumption that there is no interaction among the components of the composition, and solid circles "●" designate values which have been actually found).

With respect to the above-mentioned inorganic flame retardants, preferred is a glass material which melts or softens at the initial stage of burning of a shaped article obtained by molding the resin composition containing the glass material. Such a glass material exhibits a glass transition temperature (Tg) in the range of from 100 to 500° C. and an exothermic peak at a temperature higher than the Tg and not higher than 700° C., as measured by differential scanning calorimetry (DSC) (see FIG. 1(b) and the explanation of the measuring methods in the Examples below). Further, with respect to the glass material, when the temperature at the onset of the exothermic peak (hereinafter, referred to as the "onset temperature") in the DSC chart is in the range of 300 to 600° C. and the amount of heat corresponding to the exothermic peak in the DSC chart is at least 10 J/g, the composition containing the glass material exhibits an excellent flame retardancy (with respect to the method for measuring the onset temperature of the exothermic peak, see FIG. 1(b) and the explanation of the measuring methods in the Examples below).

When a glass material having a Tg within the above-mentioned range is used as flame retardant (C), the glass material is melted at the initial stage of burning of a shaped article produced from the composition containing such a glass material to thereby form a heat insulating layer on the surface of the shaped article, wherein the heat insulating layer protects the shaped article from the heat of combustion. Especially when the Tg of the glass material is not higher than the temperature at which the heat decomposition of the resin contained in the composition starts, the flame retardancy of the composition is further improved. Further, in this case, at the middle stage of burning of a shaped article produced from the composition containing such a glass material, the curing of the flame retardant is promoted due to the thickening, solidification or crosslinking which occurs by the heat generated in the vigorous thermal decomposition of the resin, thereby forming an insulating layer on the surface of the shaped article. Therefore, the diffusion of the volatile decomposition products generated by the decomposition of the resin is prevented to thereby improve the balance between the self-extinguishing property and the effect of preventing dripping of flaming particles.

With respect to the composition containing the glass material as flame retardant (C), it is especially preferred that the onset temperature of the exothermic peak is in the range of from 300 to 600° C., and that the area of the exothermic peak is large. Especially when the amount of heat corresponding to the exothermic peak in the DSC chart is 10 J/g or more, the composition exhibits an extremely excellent flame retardancy.

Examples of glass materials having the above-mentioned properties include $SiO_2$—$MgO$—$H_2O$ (hydrated glass) and a glassy compound, such as $PbO$—$B_2O_3$, $ZnO$—$P_2O_5$—$MgO$, $P_2O_5$—$B_2O_3$—$PbO$—$MgO$, P—Sn—O—F, $PbO$—$V_2O_5$—$TeO_2$, $Al_2O_3.H_2O$, tin halide, lead borosilicate and the like. For obtaining a glass material having a Tg within the range of from 100 to 500° C., it is preferred that the glass material contains an aluminophosphate glass. For obtaining a glass material exhibiting an exothermic peak within the range of from 100 to 700° C., it is preferred that the glass material contains zirconium which accelerates crystallization. Further, it is also preferred that the glass material contains a silicate glass which easily causes a crosslinking reaction or contains titanium oxide which has a high thickening effect. It is especially preferred that the glass material contains a plurality of elements selected from the group consisting of elements belonging to 1A, 2A, 4A, 2B, 3B, 4B, 5B and 6B groups of the Periodic Table. More specifically, it is preferred that the glass material comprises a metal oxide selected from the group consisting of $SiO_2$, $Al_2O_3$, $B_2O_3$, $P_2O_5$, $Na_2O$, $K_2O$, $Li_2O$, $CaO$, $BaO$, $ZnO$, $Sb_2O_3$, $ZrO_2$ and $TiO_2$. When it is intended to lower the melting temperature of the glass material, the melting temperature can be lowered by increasing the content of $P_2O_5$, $Na_2O$, $K_2O$, $Li_2O$ or $Sb_2O$ in the glass material. The oxide of an element having a small ion radius has high mobility, so that, by the use of the oxide of such an element, the melt viscosity of the glass material can be lowered. On the other hand, a crosslinking reaction in the molten glass material can be promoted by increasing the content of $SiO_2$ or $Al_2O_3$. Further, the proportion of $B_2O_3$ (which accelerates a vitrification) and/or the proportion of $CaO$, $BaO$ or $ZnO$ (each of which improves the stability of the glass material) may be increased.

The triazine skeleton-containing compound as flame retardant (C) can be used as an auxiliary flame retardant for enhancing the effect of a phosphorus flame retardant. Specific examples of the above-mentioned triazine compounds include melamine, melam, melem, mellon (a product obtained by the ammonia-liberation reaction of melem at 600° C. or higher, in which three molecules of ammonia are liberated from three molecules of melem), melamine cyanurate, melamine phosphate, succinoguanamine, adipoguanamine, methylglutaroguanamine, a melamine resin and a BT resin. Of these, melamine cyanurate is preferred from the viewpoint of low volatility.

As a silicone resin usable as flame retardant (C), there can be mentioned a silicone resin having a three-dimensional network structure which is constructed by combining the structural units $SiO_2$, $R_1SiO_{3/2}$, $R_2SiO$ and $R_3SiO_{1/2}$, wherein R independently represents an alkyl group, such as a methyl group, an ethyl group or a propyl group, or an aromatic group, such as a phenyl group or a benzyl group, or a vinyl group-containing substituent group obtained by introducing a vinyl group to the above-mentioned alkyl group or the above-mentioned aromatic group. Especially preferred is a silicone resin in which R is the above-mentioned vinyl group-containing substituent group. These silicone resins can be obtained by hydrolyzing organohalosilanes corresponding to the above-mentioned structural units and subsequently polymerizing the hydrolyzed products.

With respect to the silicone oil usable as flame retardant (C), preferred is a polydiorganosiloxane, especially a vinyl group-containing silicone oil. It is preferred that the viscosity of the silicone oil is from 600 to 1,000,000 centistokes (as measured at 25° C.), more advantageously 90,000 to 150,000 centistokes (as measured at 25° C.).

Silica, which is usable as flame retardant (C), is amorphous silicon dioxide. Especially, silica coated with a hydrocarbon compound (which is obtained by treating the surface of silica with a silane coupling agent composed of a silane and a hydrocarbon compound linked thereto) is preferred. Silica coated with a vinyl group-containing hydrocarbon compound is more preferred.

Examples of silane coupling agents include vinyl group-containing silanes, such as p-styryltrimethoxysilane, vinyltrichlorosilane, vinyltris(β-methoxyethoxy)silane, vinyltriethoxysilane, vinyltrimethoxysilane and γ-methacryloxypropyltrimethoxysilane; epoxysilanes, such as β-(3,4-epoxycyclohexyl)ethyltrimethoxysilane, γ-glycidoxypropyltrimethoxysilane and γ-glycidoxypropyltriethoxysilane; and aminosilanes, such as N-β-(aminoethyl)-γ-aminopropyltrimethoxysilane, N-β-(aminoethyl)-γ-aminopropylmethyldimethoxysilane, γ-aminopropyltriethoxysilane and N-phenyl-γ-aminopropyltrimethoxysilane. Of these, preferred are silane coupling agents having a structural unit which is similar to that of a thermoplastic resin employed. For example, when a styrene polymer is used as a thermoplastic resin, p-styryltrimethoxysilane is suitable.

The methods for treating silica with a silane coupling agent can be roughly classified into a wet method and a dry method. In the wet method, silica is immersed in a solution of a silane coupling agent, followed by drying. In the dry method, silica is charged in an apparatus capable of agitating at a high speed (e.g., Henschel mixer), and a solution of a silane coupling agent is gradually dropped in the charged silica under agitation, followed by heat-treatment.

With respect to the above-mentioned aramid fiber, which is usable as flame retardant (C), it is preferred that the fiber has an average diameter of from 1 to 500 μm and an average fiber length of from 0.1 to 10 mm. The aramid fiber can be produced by a method in which isophthalamide or polyparaphenylene terephthalamide is dissolved in a polar solvent containing an amide, or sulfuric acid, and the resultant solution is subjected to dry spinning or wet spinning.

With respect to the above-mentioned polyacrylonitrile fiber, which is usable as flame retardant (C), it is preferred that the average diameter is 1 to 500 μm and the average fiber length is 0.1 to 10 mm. With respect to the method for producing a polyacrylonitrile fiber, there can be mentioned a dry spinning method in which an acrylonitrile polymer is dissolved in a solvent (such as dimethylformamide), and the resultant solution is subjected to spinning under the flow of air at 400° C., and a wet spinning method in which an acrylonitrile polymer is dissolved in a solvent (such as nitric acid), and the resultant solution is subjected to spinning in water.

The fluororesin, which is usable as flame retardant (C), is a resin containing fluorine atoms. Specific examples of fluororesins include polymonofluoroethylene, polydifluoroethylene, polytrifluoroethylene, polytetrafluoroethylene and a tetrafluoroethylene-hexafluoropropylene copolymer. If desired, a fluorine-containing monomer may be copolymerized with a comonomer which is copolymerizable with the fluorine-containing monomer.

With respect to the method for producing a fluororesin, reference can be made to U.S. Pat. Nos. 2,393,697 and 2,534,058. For example, a powdery polytetrafluoroethylene can be obtained by a method comprising polymerizing tetrafluoroethylene in an aqueous medium at a temperature of from 0 to 200° C. under a pressure of from 7 to 70 kg/cm$^2$ using a radical initiator (such as ammonium persulfate or potassium persulfate), and coagulating or precipitating the resultant reaction mixture (in a suspension, a dispersion or an emulsion form).

As examples of methods for causing the above-mentioned fluororesin to have a fibrous morphology, the following three methods can be mentioned. In a first method (two-step process), a fluororesin, a thermoplastic resin, and optionally a dispersant are melt-kneaded together, thereby obtaining a masterbatch, and then the obtained masterbatch is melt-kneaded together with a thermoplastic resin and a flame retardant. In a second method (one-step process), an extruder which has first and second extrusion zones is used, wherein the second extrusion zone has a side feeding inlet. In the second method, a fluororesin, a thermoplastic resin and optionally a dispersant are melt-kneaded together in the first extrusion zone and then, further melt-kneaded in the second extrusion zone at a temperature which is lower than the temperature in the first extrusion zone, while feeding a flame retardant through the side feeding inlet. In a third method (one-step process), all components (including a fluororesin) for the resin composition are simultaneously fed into an extruder through the main feeder thereof and melt-kneaded. From the viewpoint of achieving a high flame retardancy of the final resin composition, preferred is the two-step process in which a masterbatch is produced.

A novolak resin can be used as flame retardant (C). The novolak resin can be obtained by subjecting a phenol and an aldehyde to a condensation reaction in the presence of an acid catalyst, such as sulfuric acid or hydrochloric acid. The method for producing a novolak resin is described at pages 437 to 455 of "Kobunshi Jikkengaku 5, Jushukugo-to-Jufuka (Experimental Polymer Chemistry, Series 5, Polycondensation and Polyaddition)" (which was published by Kyoritsu Shuppan Co., Ltd., Japan).

Specific examples of phenols used for the production of novolak resins include phenol; o-cresol; m-cresol; p-cresol; 2,5-dimethyl-, 3,5-dimethyl-, 2,3,5-trimethyl-, 3,4,5-trimethyl-, p-t-butyl-, p-n-octyl-, p-stearyl-, p-phenyl-, p-(2-phenylethyl)-, o-isopropyl-, p-isopropyl-, m-isopropyl-, p-methoxy- and p-phenoxy-phenols; pyrocatechol; resorcinol; hydroquinone; salicylaldehyde; salicylic acid; p-hydroxybenzoic acid; methyl p-hydroxybenzoate; p-cyano and o-cyanophenols; p-hydroxybenzenesulfonic acid; p-hydroxybenzenesulfonamide; cyclohexyl p-hydroxybenzenesulfonate; (4-hydroxyphenyl)-phenylphosphinic acid; methyl (4-hydroxyphenyl)-phenylphosphinate, 4-hydroxyphenyl-phosphonic acid; ethyl 4-hydroxyphenylphosphonate; and diphenyl 4-hydroxyphenylphosphonate.

Specific examples of aldehydes used for the production of novolak resins include formaldehyde, acetaldehyde, n-propanal, n-butanal, isobutyl aldehyde, 3-methyl-n-butanal, benzaldehyde, p-tolylaldehyde and 2-phenylacetoaldehyde.

When flame retardant (C) is used in combination with silicon-containing flame retardant (A), it is preferred that the amount of flame retardant (C) is from 0.001 to 100 parts by weight, more advantageously 1 to 50 parts by weight, still more advantageously 3 to 20 parts by weight, most advantageously 5 to 15 parts by weight, relative to 100 parts by weight of polymer (B).

If desired, in the present invention, a processing aid (D) (hereinafter, frequently referred to as "processing aid (D)") may optionally be used. As processing aid (D), there can be used at least one mold release agent or fluidity improver selected from the group consisting of an aliphatic hydrocarbon, a higher fatty acid, a higher fatty acid ester, a higher fatty acid amide, a higher aliphatic alcohol, a metallic soap, an organosiloxane wax, a polyolefin wax and a polycaprolactone.

The amount of processing aid (D) is preferably from 0.01 to 20 parts by weight, more preferably from 0.5 to 10 parts by weight, still more preferably from 1 to 5 parts by weight, relative to 100 parts by weight of polymer (B).

When the resin composition comprising silicon-containing flame retardant (A) of the present invention is required to have high light resistance, the resin composition may optionally contain a light resistance improver (hereinbelow, frequently referred to as "light resistance improver (E)") selected from the group consisting of an ultraviolet light absorber, a hindered amine light stabilizer, an antioxidant, an active species capturing agent, a sunproofing agent, a metal inactivating agent, and a light quenching agent.

The amount of light resistance improver (E) is preferably from 0.05 to 20 parts by weight, more preferably from 0.1 to 10 parts by weight, most preferably from 1 to 5 parts by weight, relative to 100 parts by weight of polymer (B).

The ultraviolet (UV) light absorber as light resistance improver (E) is a component which absorbs light energy and releases the absorbed light energy as a harmless heat energy by, for example, a mechanism in which the molecule is transformed into a keto form through an intramolecular proton transfer (in the case of benzophenone UV light absorbers and benzotriazole UV light absorbers) or a mechanism in which the molecule undergoes a cis-trans isomerization (in the case of cyanoacrylate UV light absorbers).

The hindered amine light stabilizer as light resistance improver (E) is a component which decomposes hydroperoxides produced by light energy into a stable N—O• radical, N—OR or N—OH, thereby imparting a light stability to the composition.

The antioxidant as light resistance improver (E) serves to stabilize peroxide radicals, such as a hydroperoxide radical, which is generated at the time of heat molding or at the time of light exposure, or serves to decompose a generated peroxide, such as a hydroperoxide, thereby imparting a light stability to the composition. Examples of antioxidants include hindered phenol antioxidants and phosphate type decomposers for peroxides. The hindered phenol antioxidant acts as a radical chain inhibitor to prevent autoxidation, and the phosphite type decomposer for peroxides decompose a generated peroxide into a stable alcohol to thereby prevent autoxidation.

The active species-capturing agent as light resistance improver (E) is a component used for capturing active species, such as free halogen radicals produced at the time of heat molding or light exposure. Specific examples of active species-capturing agents include basic metal salts of higher fatty acids and organic epoxy compounds.

The sunproofing agent as light resistance improver (E) is a component used for preventing light from penetrating into the interior of a polymer.

The metal inactivating agent as light resistance improver (E) is a component used for inactivating heavy metal ions in the resin through the formation of a chelate compound.

The light quenching agent as light resistance improver (E) is a component used for inactivating photo-excited functional groups, such as hydroperoxides and carbonyl groups, formed in the polymer. The inactivation occurs due to the energy transfer from the functional groups. Organic nickel compounds and the like are known as the light quenching agents.

As examples of methods for producing a composition comprising silicon-containing flame retardant (A) of the present invention and organic polymer (B), there can be mentioned:

a method in which polymer (B) is mixed with silicon-containing flame retardant (A), and the resultant mixture is melt-kneaded by means of an extruder;

a method in which polymer (B) is melted in an extruder, and silicon-containing flame retardant (A) is added to the melted polymer (B) in the extruder, and the resultant mixture is melt-kneaded by means of the extruder; and a method in which a masterbatch is produced by melt-kneading the entire of polymer (B) and a part of silicon-containing flame retardant (A) or melt-kneading a part of polymer (B) and the entire of silicon-containing flame retardant (A), and then the remainder of polymer (B) or silicon-containing flame retardant (A), and optionally a flame retardant other than silicon-containing flame retardant (A) are added to the masterbatch, followed by melt-kneading.

With respect to the extruder used for the melt extrusion, it is preferred to use a twin-screw extruder. With respect to the twin-screw extruder, it is preferred that the L/D (ratio of the length L of each screw to the inner diameter D of a cylinder portion of the extruder) value is from 20 to 50. Further, it is preferred that the twin-screw extruder has at least two inlets including a main feeding inlet and a side feeding inlet, and has kneading zones positioned at a region between the two or more feeding inlets and at a region extending from one end portion of the extruder to the feeding inlet provided at a position adjacent to the one end portion of the extruder, wherein each of the kneading zones independently has a length corresponding to 3D to 10D.

A preferred form of a composition comprising silicon-containing flame retardant (A) of the present invention and organic polymer (B) is a resin composition comprising:

0.1 to 100 parts by weight of silicon-containing flame retardant (A), such as dimethoxypolysiloxane, methoxyphenoxypolysiloxane or diphenoxypolysiloxane;

100 parts by weight of organic polymer (B) comprising an aromatic polycarbonate or a resin mixture of an aromatic polycarbonate and a styrene polymer; and 0.001 to 10 parts by weight of an organic sulfonic acid metal salt (such as potassium diphenylsulfone-3-sulfonate).

This resin composition has an excellent balance of various properties, such as flame retardancy, suitability for continuous molding, moldability (melt fluidity), impact resistance, heat resistance and heat stability.

The composition comprising silicon-containing flame retardant (A) of the present invention and organic polymer (B) can be obtained by, for example, melt-kneading the above-mentioned components, using a commercially available single-screw or twin-screw extruder. In the production of the composition, if desired, additives other than the above-mentioned components may be added. Examples of additives include thermal stabilizers; lubricants; fillers; reinforcement agents, such as glass fibers; and colorants, such as dyes and pigments.

The composition obtained as described above can be subjected to a continuous molding for a long period of time by means of, for example, an injection molding machine or an extrusion molding machine. The resultant molded product has excellent flame retardancy, excellent heat resistance and excellent impact strength.

BEST MODE FOR CARRYING OUT THE INVENTION

Hereinbelow, the present invention will be described in more detail with reference to the following Examples, Comparative Examples and Reference Examples, which should not be construed as limiting the scope of the present invention.

In the following Examples, Comparative Examples and Reference Examples, various properties were measured and evaluated as follows.

(1) Analysis of the Composition of a Silicon-containing Flame Retardant

The analysis of the composition of a silicon-containing flame retardant was conducted by gas chromatography under the below-described conditions using the following apparatus.

GC apparatus: GC-7A (manufactured and sold by Shimadzu Corporation, Japan)
Column: fused silica megapore column (inner diameter: 0.53 mm; length: 30 m)
Carrier gas: helium gas; flow rate: 8 ml/min (mass flow control)
Temperature:
   Column: The column temperature was elevated from 50 to 250° C. at a rate of 8° C./min
   Inlet: 250° C.
   Detector: 270° C.
Detector: FID detector For suppressing the broadening of the peak, helium gas was introduced, as a makeup gas, to the outlet of the column at a flow rate of 60 ml/min.
Internal standard: m-xylene (sample/internal standard weight ratio=10/1)
The amount of a sample injected: 0.5 µl (direct injection)

(2) The Molecular Weight of a Silicon-containing Flame Retardant

The molecular weight of a silicon-containing flame retardant of a silicon-containing flame retardant was measured by high temperature gel permeation chromatography (GPC), using a calibration curve obtained with respect to standard polystyrene systems. The conditions of the analysis were as follows.

Column: polystyrene gel column×2
   Solvent: chloroform
   Flow rate: 1.0 ml/min
   Detector: RI detector 32×4 RIU/FS
   Chart rate: 10 mm/min
   Data processing: processor CP-8000, manufactured and sold by Tosoh Corp., Japan (3) Volatility of a Silicon-containing Flame Retardant (Thermogravimetric Analysis; TGA Method)

The volatility of a silicon-containing flame retardant was evaluated using a thermogravimetric analyzer DT-40 (manufactured and sold by Shimadzu Corporation, Japan). Specifically, the temperature of the silicon-containing flame retardant was elevated at a rate of 40° C./min under a flow of nitrogen gas. The temperature at which a 1% weight loss occurred was taken as an index of the volatility.

(4) Water Resistance of a Silicon-containing Flame Retardant

A shaped article was immersed in hot water at 80° C. for 24 hours. From the change in the surface appearance of the shaped article, water resistance was evaluated as follows.
   ⊚: extremely excellent
   ○: good
   Δ: generally good, but slightly whitened
   ×: the entire was whitened (5) Flame Retardancy The self-extinguishing properties of a ⅛ inch-thick specimen were evaluated in accordance with the VB (Vertical Burning) Method which is described in UL-Subject 94.

(6) Izod Impact Strength

The Izod impact strength of a ⅛ inch-thick, V-notched specimen was measured at 23° C. in accordance with ASTM-D256.

(7) Heat Distortion Temperature

As a criterion of heat resistance, the heat distortion temperature of a ¼ inch-thick specimen was measured in accordance with ASTM-D648 (testing load: 18.5 kg/cm)

(8) Melt Flow Rate (MFR)

The melt flow rate was measured in accordance with ASTM-D1238, and used as a criterion of melt fluidity. That is, the melt flow rate was determined from the extrusion rate (g/10 min) of a resin composition as measured at a melting temperature of 220° C. under a load of 10 kg.

(9) The Amount of Char Formed (Thermogravimetric Analysis: TGA Method)

The amount of char formed was measured using a thermogravimetric analyzer DT-40 (manufactured and sold by Shimadzu Corporation, Japan) by a method in which the temperature of a sample was elevated at a rate of 40° C./min under a flow of nitrogen gas. The amount (%) of the sample remaining at 500° C. was used as a criterion of the amount of char formed.

(10) SP Value (δ)(Solubility Parameter) and an Average SP Value

The SP value was calculated in accordance with the following Fedors Formula, which is described in Polymer Engineering and Science, 14, (2), 147 (1974), using the data of $\Delta e1$ and $\Delta v1$ of functional groups of polymers, which data are also described therein:

$$\delta = \sqrt{[\Sigma(\Delta e1)/\Sigma(\Delta v1)]}$$

wherein $\Delta e1$ represents the cohesive energy per unit functional group, and $\Delta v1$ represents the molecular volume per unit functional group, and the unit for $\delta$ is $(cal/cm^3)^{1/2}$.

The average SP value of a copolymer or a blend of copolymers was calculated from the SP values of the different constituent monomer units of the copolymer or the SP values of the different constituent copolymers of the copolymer blend by the proportional allocation of the respective SP values of the different constituent monomer units or the different constituent copolymers in accordance with the respective weight ratios of the constituent monomer units or the constituent copolymers, on the assumption that the additivity rule can be applied.

(11) Glass Transition Temperature (Tg), and Onset Temperature and Peak Top Temperature of the Exothermic Peak The glass transition temperature (Tg), and the onset temperature and peak top temperature of the exothermic peak were measured by the differential scanning calorimetry (DSC) method described in "Polymer Handbook" (edited by J. Brandrup, A Wiley Interscience Publication, John Wiley & Sons, New York, U.S.A., 1975). In accordance with the differential scanning calorimetry (DSC) method, the Tg, and the onset temperature and peak top temperature of the exothermic peak were determined by observing the gradational change in the specific heat capacity. Specifically, the measurements were conducted using a thermal analysis apparatus (Model DT-40, manufactured and sold by Shimadzu Corporation, Japan), in which the temperature of 5 mg of a sample was elevated at a rate of 10° C./min. under a flow of nitrogen gas. The Tg is defined as a temperature corresponding to the intersection of the base line with a straight line drawn from the first step of the line of the specific heat capacity (see FIG. 1(a)). The exothermic peak is a curve showing the change of the specific heat capacity, relative to the specific heat capacity at the base line. The exothermic peak includes both a broad curve and a sharp curve. The peak top temperature of the exothermic peak is defined as a temperature corresponding to the point of contact between the curve showing the change of the specific heat capacity with the tangent line drawn in parallel with the base line. The onset temperature of the exothermic peak is defined as a temperature corresponding to the intersection of the base line with a straight line drawn substantially along the slope showing the onset of the exothermic peak (see FIG. 1(b)).

The "Polymer Handbook" describes that the glass transition temperatures (Tg's) of polyphenylene ether ("poly(2,6-dimethyl-1,4-phenylene oxide"), aromatic polycarbonate ("polycarbonate of bisphenol A"), polystyrene and poly(vinyl chloride) are 209° C., 145° C., 100° C. and 81° C., respectively.

(12) Distribution of the Concentration of Silicon Atoms Along the Thickness-wise Direction of a Shaped Article The distribution of the concentration of silicon atoms at the surface portion of a shaped article was analyzed by X-ray photoelectron spectroscopy. In the X-ray photoelectron spectroscopy, the variation of concentration from the surface to the depth of the shaped article can be measured by varying the irradiation angle. On the other hand, the average concentration of silicon atoms contained in the whole shaped article was measured by the X-ray fluorescence analysis method. The distribution of silicon atoms along the thicknesswise direction of the shaped article was evaluated in terms of a $C^1/C^2$ ratio, wherein $C^1$ is an average concentration (%) of silicon atoms measured by X-ray electron spectroscopy with respect to the surface portion (up to the depth of 50 Å from the surface) of the article, and $C^2$ is an average concentration (%) of silicon atoms measured by X-ray fluorescence analysis with respect to the whole of the shaped article. The larger the $C^1/C^2$ ratio, the larger the amount of the silicon atoms which are biasedly present at the surface portion of the shaped article. Specific methods for the measurements were as follows.

1. X-ray Photoelectron Spectroscopy

The measurement was conducted using ESCA 5400 (manufactured and sold by ULVAC-PHI INC., Japan) under the following conditions.

X-ray source: MgKα (15 kv, 400 w)

Irradiation angle : 45°, 30°, 75°

Area measured: 1.1 mmϕ

2. X-ray Fluorescence Method

The measurement was conducted using SFX-1100 (manufactured and sold by Shimadzu Corporation, Japan) under the following conditions.

X-ray source: PKα or SiKα (400 kv)

Irradiation angle: 108.88°

(13) Appearance

The appearance of a shaped article was evaluated by visual observation in accordance with the following criteria.

⊚: excellent

◯: good

Δ: good, however, slightly poor in smoothness and gloss

×: poor smoothness and gloss

(14) Scratch Resistance

The surface of a shaped article was scratched by a pencil having a hardness of "H" and, then, the appearance of the shaped article was evaluated by visual observation in accordance with the following criteria.

⊚: excellent

◯: good

Δ: good, however, slight scratch is observed

×: marked scratch is observed

The materials used in Examples, Comparative Examples and Reference Examples are as follows.

(I) Silicon Compound (1) Production of Silicon-containing Flame Retardant (A) (a Linear Silicate)

100 parts by weight of tetramethoxysilane and 32 parts by weight of methanol were charged in a reactor equipped with a stirrer, a condenser, a thermometer and a tube for introducing nitrogen gas, and stirred for 5 minutes. Then, 14 parts by weight of water and 0.02 part by weight of 20% hydrochloric acid were added thereto. The resultant mixture was heated to 65° C. at which the mixture was under reflux, and a reaction was effected for 4 hours under ref lux (at 65° C.). Subsequently, the internal temperature of the reactor was elevated to 150° C. while stirring, thereby distilling off the methanol in the reactor. Then, high purity nitrogen gas was blown into the reactor while maintaining the internal temperature of the reactor at 150° C. so as to distill off tetramethoxysilane remaining in the reactor, to thereby obtain dimethoxypolysiloxane (hereinafter referred to as "FR1"). The obtained FR1 was cooled to room temperature, and the FR1 was subjected to measurement of the molecular weight and analysis of the composition. The number average n-value (the average number of the recurring units) was found to be 20. When it was desired to purify FR1, the silane compound (starting material) and alcohol, each remaining in FR1, were removed by substantially the same method as mentioned above (wherein, for example, the number of times of the distillation for removing the silane compound and alcohol was increased). Further, the color number (APHA) as measured in accordance with JIS-K0101 was controlled by changing the number of times of the distillation.

Substantially the same procedure as described above was repeated, except that various tetraalkoxysilanes or tetraaryloxysilanes were used, thereby producing other linear silicates having different structures. Further, the partial hydrolysis and dehydration-condensation reactions were conducted, wherein the molar ratio of water to the tetraalkoxysilanes or tetraaryloxysilanes was varied, to thereby obtain linear silicates having different molecular weights.

(2) Production of Linear Methylethoxypolysiloxane (fr1)

Substantially the same procedure as described in item (1) above (production of FR1) was repeated, except that methyltriethoxysilane was used in place of tetramethoxysilane, to thereby obtain methylethoxypolysiloxane (hereinafter referred to as "fr1"). The number average n-value of the obtained fr1 was 20.

(3) Production of Silicate Resin (fr2)

To a mixture of 84.7 parts by weight of concentrated hydrochloric acid and 105.3 parts by weight of water were added 168 parts by weight of a 40% aqueous solution of sodium silicate $Na_2O \cdot (SiO_2)_{3.22} \cdot (H_2O)_7$ and 255.2 parts by weight of water over about 3 minutes. To the resultant mixture were added 104 parts by weight (0.806 mole) of dimethylphenylchlorosilane, 19.4 parts by weight (0.138 mole) of methylvinyldichlorosilane and 26.8 parts by weight of toluene while stirring. The resultant mixture was heated for 2 hours under reflux while vigorously stirring. After the 2 hour period, additional 50 parts by weight of toluene was added to the mixture. Subsequently, the organic phase of the resultant reaction mixture was collected and heated so as to remove all volatile components having a boiling point lower than 125° C., to thereby obtain 130 parts by weight of a liquid. To the obtained liquid were added 50 parts by weight of toluene and 0.27 part by weight of a 30% aqueous solution of potassium hydroxide, and the resultant mixture was heated under reflux for 3 hours so as to remove the water by-produced in the course of the condensation reaction.

The mixture was then subjected to filtration so as to collect a precipitated solid which had occurred in the mixture, to thereby obtain a silicate resin in a solid form (yield: about 38%) (hereinafter referred to as "fr2"). The obtained silicate resin contained 1.4 moles of dimethylphenylsiloxane units and 0.25 mole of methylvinylsiloxane units per mole of $SiO_2$ unit.

(4) Dimethylsilicone (fr3)

A commercially available dimethylsilicone (kinematic viscosity: 100 centistokes (CS)) (trade name: Shin-Etsu Silicone KF96, manufactured and sold by Shin-Etsu Chemical CO., Ltd, Japan) (hereinafter referred to as "fr3") was used.

(5) Silicone Resin (fr4)

A commercially available MQ silicone resin (M: monofunctional $(CH_3)_3SiO_{0.5}$ unit, Q: tetrafunctional $SiO_2$ unit) (trade name: Shin-Etsu Silicone, manufactured and sold by Shin-Etsu Chemical Co., Ltd., Japan) (hereinafter referred to as "fr4") was used.

(II) Polymer (B)

(1) Aromatic Polycarbonate (PC)

A commercially available bisphenol A type polycarbonate (trade name: Calibre 13, manufactured and sold by Sumitomo Dow Limited, Japan) (hereinafter referred to as "PC") was used.

(2) Rubber-modified Styrene Polymer (HIPS)

A commercially available rubber-modified polystyrene (butadiene/styrene weight ratio=10/90) (trade name: Styron, manufactured and sold by Asahi Chemical Industry Co., Ltd., Japan) (hereinafter referred to as "HIPS") was used.

(3) ABS Resin (ABS)

A commercially available ABS resin (acrylontrile/polybutadiene/styrene weight ratio=24/20/56)) (trade name: Stylac ABS, manufactured and sold by Asahi Chemical Industry Co., Ltd., Japan) (hereinafter referred to as "ABS") was used.

(4) Styrene-ethylene-butylene-styrene Copolymer (SEBS)

A commercially available styrene-ethylene-butylene-styrene copolymer (trade name: Tuftec, manufactured and sold by Asahi Chemical Industry Co., Ltd., Japan) (hereinafter referred to as "SEBS") was used.

(5) Styrene-butadiene Copolymer (SB)

A commercially available styrene-butadiene copolymer (trade name: Tufprene, manufactured and sold by Asahi Chemical Industry Co., Ltd., Japan) (hereinafter referred to as "SB") was used.

(6) Epoxidated Styrene-butadiene Copolymer (ESB)

A commercially available epoxidated styrene-butadiene copolymer (trade name: Epofriend, manufactured and sold by Daicel Chemical Industries Co., Ltd., Japan) (hereinafter referred to as "ESB") was used.

(7) Syndiotactic Styrene Polymer (SPS)

A commercially available syndiotactic polystyrene having a weight average molecular weight of 320,000 and a melting temperature of 270° C. (hereinafter referred to as "SPS") was used.

(8) Styrene Copolymer Having Copolymerization Distribution (AS-1)

The styrene copolymer produced by the following method was used as a compatibility agent.

A mixture of 3.4 parts by weight of acrylonitrile, 81.6 parts by weight of styrene, 15 parts by weight of ethylbenzene and, as a polymerization initiator, 0.03 part by weight of 1,1-bis(t-butylperoxy)-3,3,5-trimethylcyclohexane was continuously fed to a plug flow type reactor, having three regions connected in series and each equipped with an agitator, at a rate of 0.7 liter/hr. Polymerization was performed at 126° C. and 100 rpm in the first region; at 135° C. and 20 rpm in the second region; and at 147° C. and 10 rpm in the third region. Subsequently, the resultant polymerization reaction mixture was transferred to a degassing apparatus having a temperature of 230° C., to remove unreacted monomers and the solvent. Thus, a random copolymer (hereinafter referred to as "AS-1") was obtained. The obtained copolymer was subjected to analysis (according to a method described in International Patent Application Publication No. WO95-35346). It was found that the copolymer contained 6% by weight of an acrylonitrile monomer unit and 94% by weight of a styrene monomer unit (as measured by infrared absorption spectrophotometry), and had an average SP value of 10.75. Further, the distribution of the proportions of the component monomers of the copolymer was measured by liquid chromatography. It was found that the proportion of the acrylonitrile monomer unit was varied in the range of from 0 to 12% by weight in the copolymer, and the maximum SP value was 11.0, the minimum SP value was 10.5, and the ΔSP value was 0.5.

(9) Copolymer Having Uniform Copolymerization Distribution (AS-2)

The copolymer produced by the following method was used as a compatibility agent.

Substantially the same procedure as in the production of copolymer AS-1 above was repeated, except that a complete mixing type reactor was used as a polymerization reactor. The obtained copolymer was analyzed. It was found that the copolymer contained 6% by weight of an acrylonitrile monomer unit and 94% by weight of a styrene monomer unit (as measured by infrared absorption spectrophotometry). Further, the distribution of the proportions of the component monomers of the copolymer was measured by liquid chromatography. It was found that the copolymer had a maximum SP value was 11.0, a minimum SP value of 10.8, and a ΔSP value of 0.2.

(10) Poly(methyl methacrylate) (PMMA)

A commercially available poly(methyl methacrylate) (trade name: Delpet, manufactured and sold by Asahi Chemical Industry Co., Ltd., Japan) (hereinafter referred to as "PMMA") was used.

(11) Polypropylene (PP)

A commercially available isotactic polypropylene (manufactured and sold by Japan Polychem Corporation, Japan) (hereinafter referred to as "PP") was used.

(12) Ethylene-octene Copolymer (EO)

A commercially available ethylene-octene copolymer (ethylene/octene weight ratio=72/28) (manufactured and sold by Dupont-Dow Elastomers Company, U.S.A.) (hereinafter referred to as "EO") was used.

(III) Other Flame Retardants (C)

(1) Metal Salt of Organic Sulfonic Acid (KSS)

A commercially available potassium diphenylsulfone-3-sulfonate (manufactured and sold by UCB Japan Co., Ltd., Japan) (hereinafter referred to as "KSS") was used.

(2) 1,3-phenylene-bis(diphenylphosphate) (FP)

A commercially available oligomeric aromatic phosphoric ester derived from resorcinol (trade name; CR 733S, manufactured and sold by Daihachi Chemical Industry Co., Ltd., Japan) (hereinafter referred to as "FP") was used.

(3) Aluminum Phosphate Glasses (G1–G4)

Four types of glasses (hereinafter respectively referred to as "G1", "G2", "G3" and "G4"), each of which was prepared in accordance with the method described in "Encyclopedia of Chemical Technology" Third Edition, Volume 11 p.846 (Manufacture and Processing) A Wiley-Interscience Publication, John Wiley & Sons, New York, were used. G1–G4 have the following composition.

Composition: $SiO_2.Al_2O_3$ (5–10% by weight)/$B_2O_3$ (0–5% by weight)/$P_2O_5$ (30–70% by weight)/$Na_2O.K_2O.Li_2O$ (10–30% by weight)/$CaO.BaO.ZnO$ (5–20% by weight)/$Sb_2O_3$(2–10% by weight)/$ZiO_2$ (0–20% by weight)/$TiO_2$ (0–20% by weight)

The thermal properties of G1–G4 were analyzed, and the obtained data are shown in Table 6.

(4) Glassy Inorganic Compounds

A commercially available zinc borate (manufactured and sold by Borax Chemical Company, U.S.A.) (hereinafter referred to as "ZB")

ZB was analyzed by DSC. It was found that Tg was not observed in the range of from 100 to 500° C., and an exothermic peak was not observed in the range of from 100 to 700° C.

A commercially available aluminum phosphate glass (trade name: Fillerfrit 4021, manufactured and sold by NIHON HORO YUYAKU Co., Ltd., Japan) (hereinafter referred to as "AP")

AP was analyzed by DSC. It was found that Tg was not observed in the range of from 100 to 500° C., and an exothermic peak was not observed in the range of from 100 to 700° C.

(IV) Calcium Carbonate ($CaCO_3$)

A commercially available calcium carbonate (manufactured and sold by Dowa Calfine Co., Ltd., Japan) was used.

EXAMPLES 1 AND 2

Comparative Examples 1 and 2

In each of Examples 1 and 2 and Comparative Examples 1 and 2, the production of the composition and various evaluations were conducted as follows.

A mixture of components for the composition (the amounts of the components are described in Table 1) was obtained by mechanically mixing the components. Using a laboplastomill (manufactured and sold by Toyo Seiki Co., Ltd., Japan), the obtained mixture was molten at a temperature of 230° C. at 50 rpm for 5 minutes, thereby obtaining a resin composition containing a silicon compound. From the obtained resin composition, test samples, each having a thickness of ⅛ inch, were produced by compression molding. Using the obtained test samples, the flame retardancy of the composition was evaluated by the above-mentioned evaluation method, and the amount of char formed was measured by the above-mentioned thermogravimetric analysis (TGA). The results are shown in Table 1 and FIGS. 2(a) to 3(b).

With respect also to each of the components (i.e., FR 1, fr3, PPE and FP) of the composition, the amount of char formed was measured by the above-mentioned method. The found amounts of char formed with respect to all components of the composition were summed up, thereby obtaining a calculated amount of char formed from the composition. The calculated amount is also shown in Table 1.

Table 1 and FIGS. 2(a) to 3(b) show that when the silicon-containing flame retardant of the present invention is used as an organic silicon compound, the found amount of char formed from the composition is larger than the calculated amount of char formed from the composition (which is the amount calculated from the amounts of char measured by TGA method with respect to all of the components of the composition, based on the assumption that the additivity rule can be applied). This means that a synergistic effect is achieved due to the interaction between the components of the composition and, hence, the composition containing the silicon-containing flame retardant of the present invention has an excellent flame retardancy.

EXAMPLES 3 TO 17

Comparative Examples 3 to 6

In each of Examples 3 to 17 and Comparative Examples 3 to 6, test samples were prepared in substantially the same manner as in Example 1 except that a composition having the formulation described in Table 2 was used. Using the test samples, the flame retardancy and Izod impact strength of the composition were evaluated. Further, using the test samples, the volatility of the silicon-containing flame retardant was evaluated. With respect to the silicon-containing flame retardant, the remaining alcohol content thereof was not more than 1% by weight.

The results are shown in Table 2.

Table 2 shows that the composition containing the silicon-containing flame retardant of the present invention has an excellent flame retardancy, and that especially when n (the number average n-value) in formula (1) is 10 or more, especially 20 or more, the composition has a low volatility and an extremely excellent flame retardancy.

EXAMPLES 18 TO 32

Comparative Examples 7 to 10

In each of Examples 18 to 32 and Comparative Examples 7 to 10, test samples were prepared in substantially the same manner as in Example 1 except that a composition having the formulation described in Table 3 was used, wherein the silicon-containing flame retardant used is composed of at least one unit selected from U1, U2 and U3 represented by formulae (6), (7) and (8) below, respectively. Using the test samples, the flame retardancy and water resistance of the composition was evaluated, and the distribution of silicon atoms along the thickness-wise direction of the test sample was measured. With respect to the silicon-containing flame retardant used, the number average n-value was 20, each of the remaining monomer content and the remaining alcohol content was not more than 1% by weight. The flame retardant having a U1 molar ratio of 100% is FR1.

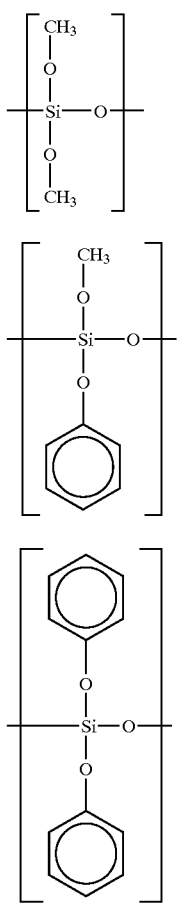

(6)

(7)

(8)

The results are shown in Table 3. Table 3 shows that the composition containing an aromatic group-containing silicate as the silicon-containing flame retardant of the present invention has remarkably excellent water resistance and flame retardancy. Table 3 also shows that the flame retardancy of the composition containing a silicate resin or a silicone resin is lowered because not only have the silicate resin and the silicone resin a low concentration of a functional group of Si—R and a low concentration of a functional group of Si—O—R, respectively, but also a shaped article obtained from a composition containing the silicate resin or the silicone resin has a low silicon atom concentration at the surface portion thereof.

EXAMPLES 33 TO 48

In each of Examples 33 to 48, test samples were prepared in substantially the same manner as in Example 1 except that a composition having the formulation described in Table 4 was used. Using the test samples, the flame retardancy, volatility and water resistance of the composition were evaluated. The silicon-containing flame retardant used was dimethoxypolysiloxane and had a number average n-value of 20. The color number (APHA) of the silicon-containing flame retardant was measured in accordance with JIS-KO10.

The results are shown in Table 4.

Table 4 shows that the composition containing the silicon-containing flame retardant of the present invention, which has characteristics that each of the remaining monomer content and the remaining alcohol content is not more than 1% by weight, and the color number (APHA) is not more than 20, has remarkably low volatility and remarkably excellent flame retardancy and water resistance.

EXAMPLE 49 TO 69

Comparative Examples 11 to 14

In each of Examples 49 to 69 and Comparative Examples 11 to 14, test samples were prepared in substantially the same manner as in Example 1 except that a composition having the formulation described in Table 5 was used. Using the test samples, the flame retardancy, MFR, Izod impact strength and heat distortion temperature of the composition were evaluated. With respect to the silicon-containing flame retardant used, the number average n-value was 20, and each of the remaining monomer content and the remaining alcohol content was not more than 1% by weight.

The results are shown in Table 5.

EXAMPLES 70 TO 75

Comparative Examples 15 to 26

In each of Examples 70 to 75 and Comparative Examples 15 to 26, test samples were prepared in substantially the same manner as in Example 1 except that a composition having the formulation described in Table 6 was used. Using the test samples, the flame retardancy of the composition was evaluated. With respect to the silicon-containing flame retardant used, the number average n-value was 20, and each of the remaining monomer content and the remaining alcohol content was not more than 1% by weight.

The results are shown in Table 6.

Reference Examples 1 to 11

In each of Reference Examples 1 to 11, test samples were prepared in substantially the same manner as in Example 1 except that a composition having the formulation described in Table 7 was used. Using the test samples, the appearance was evaluated. With respect to the silicon-containing flame retardant used, which contains U1 and/or U2, the number average n-value was 20, and each of the remaining monomer content and the remaining alcohol content was not more than 1% by weight.

The results are shown in Table 7.

Table 7 shows that, when a phenyl group-containing silicate is used as the silicon-containing flame retardant of the present invention, the dispersion of a filler, such as $CaCo_3$, is promoted, so that the appearance of a shaped article obtained from the composition containing such a silicate is improved.

Reference Examples 12 to 21

In each of Reference Examples 12 to 21, the production of a composition and various evaluations were conducted as follows.

A composition having the formulation described in Table 8, which contains an organic silicon compound and PMMA, was dissolved in chloroform, and the resultant solution was applied onto an aluminum plate and dried at 100° C. for 1 hour to thereby form a coating. Then, the appearance and scratch resistance of the coating were evaluated. With respect to the silicon-containing flame retardant used, which contains U1 and/or U2, the number average n-value was 20, and each of the remaining monomer content and the remaining alcohol content was not more than 1% by weight.

The results are shown in Table 8.

Table 8 shows that when a phenyl group-containing silicate is used as the silicon-containing flame retardant, the appearance and scratch resistance of a shaped article obtained from the composition containing such a silicate are improved.

TABLE 1

|  | Composition | | | Amount of char formed (500° C.) | | |
|---|---|---|---|---|---|---|
|  | Silicon Compound | Polymer (PPE) | Other flame retardant (FP) | Found value | Calculated value | Flame retardancy |
| FR1 | 100 | — | — | 28 | — | — |
| fr3 | 100 | — | — | 34 | — | — |
| PPE | — | 100 | — | 42 | — | — |
| FP | — | — | 100 | 7 | — | — |
| Example 1 | 50 (FR1) | 50 | 0 | 45 | 35 | Self-extinguished |
| Comparative Example 1 | 50 (fr3) | 50 | 0 | 38 | 38 | Totally burnt |
| Example 2 | 33.3 (FR1) | 33.3 | 33.3 | 50 | 26 | Self-extinguished |
| Comparative Example 2 | 33.3 (fr3) | 33.3 | 33.3 | 32 | 28 | Totally burnt |

TABLE 2

| | Composition (parts by weight) | | | | | | Evaluation | | |
|---|---|---|---|---|---|---|---|---|---|
| | Silicon compound | | | | | | | | |
| | $R^1$–$R^4$ of the silicon-containing flame retardant (A) | n | Amount (parts by weight) | (B) Polymer | | Flame retardancy | Temperature at which 1% wt loss occurred** (° C.) | Izod impact strength (kg · cm/cm) |
| | | | | Type | Amount (parts by weight) | | | |
| Example 3 | Butyl groups | 1 | 5 | HIPS | 100 | Self-extinguished | 189 | 13 |
| Example 4 | Methyl groups | 1 | | | | | 150 | 15 |
| Example 5 | | 2 | | | | | 201 | 14 |
| Example 6 | | 8 | | | | | 221 | 14 |
| Example 7* | | 10 | | | | | 269 | 13 |
| Example 8* | | 15 | | | | | 279 | 13 |
| Example 9* | | 20 | | | | | 331 | 12 |
| Example 10* | | 100 | | | | | 349 | 10 |
| Example 11* | | 200 | | | | | 351 | 10 |
| Example 12* | Methyl groups | 20 | 5 | PC | 100 | | 345 | 16 |
| Example 13* | | | | ABS | 100 | | 325 | 20 |
| Example 14* | | | | PPE | 100 | | 350 | 10 |
| Example 15* | | | | PPE/HIPS | 50/50 | | 339 | 21 |
| Example 16 | | | | PP | 100 | | 319 | 23 |
| Example 17 | | | | EO | 100 | | 312 | 36 |
| Comparative Example 3 | fr1 | | 5 | HIPS | 100 | Totally burnt | 318 | 6 |
| Comparative Example 4 | fr2 | | | | | Totally burnt | 329 | 5 |
| Comparative Example 5 | fr3 | | | | | Shaped article cannot not be obtained due to phase separation | | |
| Comparative Example 6 | fr4 | | | | | Totally burnt | 348 | 4 |

*Showing a more preferred Example.
**Temperature at which 1% weight loss occurred is taken as an index of volatility.

TABLE 3

|  |  |  |  | Example | | | | | | | | | |
|---|---|---|---|---|---|---|---|---|---|---|---|---|---|
|  |  |  |  | 18 | 19* | 20 | 21* | 22* | 23 | 24* | 25* | 26* | 27* |
| Composition | Silicon compound | Amount (parts by weight) |  |  |  |  |  |  | 7 |  |  |  |  |
|  |  | (A) Silicon-containing flame retardant | U1 | 100 |  |  | 50 | 50 |  | 40 | 90 | 80 | 20 |
|  |  |  | U2 |  | 100 |  | 50 |  | 50 | 30 | 10 | 20 | 80 |
|  |  | Monomer unit (molar ratio) | U3 |  |  | 100 |  | 50 | 50 | 30 |  |  |  |
|  |  | Other silicon compound |  |  |  |  |  |  | — |  |  |  |  |
|  | (B) Polymer (parts by weight) |  | PC |  |  |  |  |  | 100 |  |  |  |  |
|  |  |  | ABS |  |  |  |  |  | 0 |  |  |  |  |
|  | (C) Other flame retardant (parts by weight) |  | KSS |  |  |  |  |  | 0 |  |  |  |  |
|  |  |  | FP |  |  |  |  |  | 0 |  |  |  |  |
| Evaluation | Flame retardancy | Average flame-out time (sec) |  | 10 | 2 | 8 | 3 | 4 | 7 | 5 | 8 | 6 | 4 |
|  |  | Dripping of flaming particles |  | Not observed | Not observed | Not observed | Not observed | Not observed | Not observed | Not observed | Not observed | Not observed | Not observed |
|  |  | Evaluation according to UL-94 |  | V-1 | V-0 | V-1 | V-0 | V-0 | V-1 | V-0 | V-1 | V-1 | V-0 |
|  | Water resistance |  |  | Δ | ⊚ | ⊚ | ○ | ○ | ⊚ | ⊚ | ○ | ○ | ⊚ |
|  | Silicon concentration distribution $C^1/C^2$ |  |  | 19 | 10 | 3 | 14 | 12 | 5 | 10 | 17 | 15 | 12 |

|  |  |  |  | Example | | | | | Comparative Example | | | |
|---|---|---|---|---|---|---|---|---|---|---|---|---|
|  |  |  |  | 28* | 29* | 30* | 31* | 32* | 7 | 8 | 9 | 10 |
| Composition | Silicon compound | Amount (parts by weight) |  |  | 7 |  | 10 |  |  | 5 |  |  |
|  |  | (A) Silicon-containing flame retardant | U1 | 10 | 50 | 50 | 50 | 50 |  | — |  |  |
|  |  |  | U2 | 90 | 50 | 50 | 50 | 50 |  |  |  |  |
|  |  | Monomer unit (molar ratio) | U3 |  |  |  |  |  |  |  |  |  |
|  |  | Other silicon compound |  |  |  | — |  |  | fr1 | fr2 | fr3 | fr4 |
|  | (B) Polymer (parts by weight) |  | PC |  | 100 |  | 80 |  |  | 100 |  |  |
|  |  |  | ABS |  | 0 |  | 20 |  |  | 0 |  |  |
|  | (C) Other flame retardant (parts by weight) |  | KSS | 0 | 1 | 1 | 0 | 1 |  | 0 |  |  |
|  |  |  | FP |  |  | 0 | 10 | 10 |  | 0 |  |  |
| Evaluation | Flame retardancy | Average flame-out time (sec) |  | 3 | 1 | 6 | 4 | 3 | 15 | 20 | Shaped article cannot be obtained due to phase separation | 25 |
|  |  | Dripping of flaming particles |  | Not observed | Not observed | Not observed | Not observed | Not observed | Observed | Observed |  | Observed |
|  |  | Evaluation according to UL-94 |  | V-0 | V-0 | V-1 | V-0 | V-0 | V-2 | V-2 |  | V-2 |
|  | Water resistance |  |  | ⊚ | ○ | ○ | ○ | ○ | Δ | Δ |  | ⊚ |
|  | Silicon concentration distribution $C^1/C^2$ |  |  | 11 | 14 | 13 | 16 | 14 | 3 | 1.5 |  | 1.3 |

*Showing a more preferred Example.

TABLE 4

|  |  | Example | | | | | | | |
|---|---|---|---|---|---|---|---|---|---|
|  |  | 33* | 34* | 35 | 36 | 37* | 38* | 39* | 40 |
| Composition | (A) Silicon-containing flame retardant (parts by weight) |  |  |  | 10 |  |  |  |  |
|  | Remaining monomer | 0.5 | 1.0 | 1.9 | 11 | 0.5 | 0.4 | 0.6 | 0.5 |

TABLE 4-continued

|  |  |  |  |  |  |  |  |  |  |
|---|---|---|---|---|---|---|---|---|---|
|  | content (wt %) |  |  |  |  |  |  |  |  |
|  | Remaining alcohol content (wt %) | 0.6 | 0.5 | 0.6 | 0.4 | 0.3 | 1.0 | 1.5 | 9 |
|  | Color number (APHA) | 5 | 4 | 3 | 5 | 5 | 6 | 4 | 5 |
|  | (B) Polymer PC |  |  |  | 100 |  |  |  |  |
|  | (parts by ABS |  |  |  | 0 |  |  |  |  |
|  | weight) HIPS |  |  |  | 0 |  |  |  |  |
| Evaluation | Flame Average flame- retardancy out time (sec) | 3 | 5 | 7 | 9 | 2 | 5 | 7 | 10 |
|  | Dripping of flaming particles | Not observed | Not observed | Not observed | Not observed | Not observed | Not observed | Not observed | Not observed |
|  | Evaluation according to UL-94 | V-0 | V-0 | V-1 | V-1 | V-0 | V-0 | V-1 | V-1 |
|  | Temperature at which 1% weight loss occurred** (° C.) | 333 | 330 | 312 | 308 | 336 | 332 | 321 | 316 |
|  | Water resitance | ⊚ | ⊚ | ○ | ○ | ⊚ | ⊚ | ⊚ | ○ |

|  |  | Example |  |  |  |  |  |  |  |
|---|---|---|---|---|---|---|---|---|---|
|  |  | 41* | 42* | 43 | 44 | 45 | 46 | 47 | 48 |
| Composition | (A) Silicon-containing flame retardant (parts by weight) |  |  |  | 10 |  |  |  |  |
|  | Remaining monomer content (wt %) | 0.9 | 0.8 | 0.7 | 0.8 | 0.7 | 0.6 | 0.8 | 0.7 |
|  | Remaining alcohol content (wt %) | 0.6 | 0.5 | 0.6 | 0.4 | 0.5 | 0.6 | 0.5 | 0.6 |
|  | Color number (APHA) | 4 | 10 | 15 | 20 | 22 | 30 | 5 | 4 |
|  | (B) Polymer PC |  |  |  | 100 |  |  | 90 | 90 |
|  | (parts by ABS |  |  |  | 0 |  |  | 10 |  |
|  | weight) HIPS |  |  |  | 0 |  |  |  | 10 |
| Evaluation | Flame Average flame- retardancy out time (sec) | 4 | 5 | 6 | 7 | 9 | 12 | 7 | 8 |
|  | Dripping of flaming particles | Not observed | Not observed | Not observed | Not observed | Not observed | Not observed | Not observed | Not observed |
|  | Evaluation according to UL-94 | V-0 | V-0 | V-1 | V-1 | V-1 | V-1 | V-1 | V-1 |
|  | Temperature at which 1% weight loss occurred** (° C.) | 331 | 321 | 316 | 312 | 307 | 303 | 313 | 315 |
|  | Water resitance | ⊚ | ⊚ | ⊚ | ⊚ | ○ | ○ | ⊚ | ⊚ |

*Showing a more preferred Example.
**Temperature at which 1% weight loss occurred is taken as an index of volatility.

TABLE 5

|  | Example |  |  |  |  |  |  |  |  |  |  |  |
|---|---|---|---|---|---|---|---|---|---|---|---|---|
|  | 49 | 50 | 51 | 52 | 53 | 54 | 55 | 56 | 57 | 58 | 59 | 60 | 61 |

Composition

Silicon compound

| Amount (parts by weight) |  |  |  |  |  |  | 15 |  |  |  |  |  |  |
|---|---|---|---|---|---|---|---|---|---|---|---|---|---|
| (A) Silicon- U1 containing flame retardant |  |  |  |  |  |  | 100 |  |  |  |  |  |  |
| Monomer unit U2 (molar ratio) |  |  |  |  |  |  | 0 |  |  |  |  |  |  |
| Other silicon compound |  |  |  |  |  |  | — |  |  |  |  |  |  |

(B) Polymer (parts by weight)

| PC | 90 | 80 | 90 | 90 | 90 | 90 | 85 | 85 | 85 | 85 | 84 | 79 | 84 |
|---|---|---|---|---|---|---|---|---|---|---|---|---|---|
| HIPS | 10 | 10 |  |  |  |  | 10 | 10 |  |  |  |  | 10 |
| PPE |  | 10 |  |  |  |  |  |  |  |  |  |  |  |

TABLE 5-continued

| | | | | | | | | | | | | | |
|---|---|---|---|---|---|---|---|---|---|---|---|---|---|
| SB | | 10 | | | | | | | | | | | |
| SEBS | | | 10 | | | | | | 10 | 10 | 10 | 10 | |
| ESB | | | | 10 | | | | | | | | | |
| SPS | | | | | 10 | | | | | | | | |
| AS-1 | | | | | | 5 | | | 5 | | 5 | 5 | 5 |
| AS-2 | | | | | | | 5 | | | 5 | | | |
| (C) Other flame retardant (parts by weight) | | | | | | | | | | | | | |
| KSS | | | | | | | | | | | 1 | 1 | 1 |
| FP | | | | | | | | | | | | 5 | |
| Evaluation | | | | | | | | | | | | | |
| Flame retardancy | | | | | | | | | | | | | |
| Average flame-out time (sec) | 7 | 5 | 6 | 7 | 7 | 8 | 6 | 6 | 7 | 8 | 5 | 3 | 4 |
| Dripping of flaming particles | Not observed | Not observed | Not observed | Not observed | Not observed | Not observed | Not observed | Not observed | Not observed | Not observed | Not observed | Not observed | Not observed |
| Evaluation according to UL-94 | V-1 | V-0 | V-1 | V-1 | V-1 | V-1 | V-1 | V-1 | V-1 | V-1 | V-0 | V-0 | V-0 |
| MFR (g/10 minutes) | 15 | 11 | 17 | 16 | 15 | 13 | 17 | 16 | 17 | 16 | 18 | 23 | 18 |
| Izod impact strength (kg·cm/cm) | 17 | 20 | 22 | 21 | 18 | 10 | 31 | 20 | 41 | 23 | 40 | 39 | 30 |
| Heat distortion temperature (°C.) | 110 | 121 | 108 | 109 | 108 | 113 | 111 | 110 | 110 | 109 | 109 | 104 | 110 |

| | Example | | | | | | | | Comparative Example | | | |
|---|---|---|---|---|---|---|---|---|---|---|---|---|
| | 62 | 63 | 64 | 65 | 66 | 67 | 68 | 69 | 11 | 12 | 13 | 14 |
| Composition | | | | | | | | | | | | |
| Silicon compound | | | | | | | | | | | | |
| Amount (parts by weight) | | | | 15 | | | | | | 15 | | |
| (A) Silicon-containing flame retardant U1 | | | | 50 | | | | | | — | | |
| Monomer unit U2 (molar ratio) | | | | 50 | | | | | | | | |
| Other silicon compound | | | | — | | | | | fr1 | fr2 | fr3 | fr4 |
| (B) Polymer (parts by weight) | | | | | | | | | | | | |
| PC | 90 | 90 | 90 | 90 | 90 | 90 | 85 | 85 | | | 90 | |
| HIPS | 10 | | | | | | | | | | | |
| PPE | | 10 | | | | | 10 | 10 | | | | |
| SB | | | 10 | | | | | | | | | |
| SEBS | | | | 10 | | | | | | | 10 | |
| ESB | | | | | 10 | | | | | | | |
| SPS | | | | | | 10 | | | | | | |
| AS-1 | | | | | | | 5 | | | | | |
| AS-2 | | | | | | | | 5 | | | | |
| (C) Other flame retardant (parts by weight) | | | | | | | | | | | | |
| KSS | | | | | 0 | | | | | | 0 | |
| FP | | | | | 0 | | | | | | 0 | |
| Evaluation | | | | | | | | | | | | |
| Flame retardancy | | | | | | | | | | | | |
| Average flame-out time (sec) | 3 | 1 | 2 | 3 | 2 | 3 | 3 | 3 | 20 | 30 | Shaped article cannot be obtained due to phase separation | 35 |
| Dripping of flaming particles | Not observed | Not observed | Not observed | Not observed | Not observed | Not observed | Not observed | Not observed | Observed | Observed | | Observed |
| Evaluation according to UL-94 | V-0 | V-0 | V-0 | V-0 | V-0 | V-0 | V-0 | V-0 | Below the standards | Below the standards | | Below the standards |
| MFR (g/10 minutes) | 14 | 8 | 16 | 14 | 16 | 12 | 16 | 14 | 10 | 8 | | 7 |
| Izod impact strength (kg·cm/cm) | 18 | 19 | 21 | 20 | 17 | 9 | 29 | 18 | 13 | 8 | | 5 |
| Heat distortion | 112 | 125 | 110 | 112 | 110 | 116 | 115 | 113 | 105 | 110 | | 113 |

TABLE 5-continued

Temperature (° C.)

TABLE 6

|  |  | Example |  |  |  |  |  | Comparative Example |  |  |  |  |  |
|---|---|---|---|---|---|---|---|---|---|---|---|---|---|
|  |  | 70 | 71 | 72 | 73 | 74 | 75 | 15 | 16 | 17 | 18 | 19 | 20 |
| Composition | Amount (parts by weight) Silicon Compound |  |  | 10 (A) Silicon-containing flame retardant (FR1) |  |  |  |  |  | 0 — |  |  |  |
|  | (B) HIPS (parts by weight) |  |  | 100 |  |  |  |  |  | 100 |  |  |  |
|  | Amount (parts by weight) |  |  | 20 |  |  |  |  |  | 20 |  |  |  |
|  | (C) Other flame retardant | G1 | G2 | G3 | G4 | ZB | AP | G1 | G2 | G3 | G4 | ZB | AP |
|  | Tg (° C.) | 80 | 100 | 316 | 320 | >500 | >500 | 80 | 100 | 316 | 320 | >500 | >500 |
|  | Peak temperature (° C.) | 150 | 150 | 619 | Not observed | Not observed | Not observed | 150 | 150 | 619 | Not observed | Not observed | Not observed |
| Evaluation | Flame retardancy (evaluated in accordance with UL-94) | V-0 | V-0 | V-1 | V-2 | V-2 | V-2 | Below the standards | Below the standards | Below the standards | Below the standards | Below the standards | Below the standards |

|  |  | Comparative Example |  |  |  |  |  |
|---|---|---|---|---|---|---|---|
|  |  | 21 | 22 | 23 | 24 | 25 | 26 |
| Composition | Amount (parts by weight) Silicon Compound |  |  | 10 fr2 |  |  |  |
|  | (B) HIPS (parts by weight) |  |  | 100 |  |  |  |
|  | Amount (parts by weight) |  |  | 20 |  |  |  |
|  | (C) Other flame retardant | G1 | G2 | G3 | G4 | ZB | AP |
|  | Tg (° C.) | 80 | 100 | 316 | 320 | >500 | >500 |
|  | Peak temperature (° C.) | 150 | 150 | 619 | Not observed | Not observed | Not observed |
| Evaluation | Flame retardancy (evaluated in accordance with UL-94) | Below the standards | Below the standards | Below the standards | Below the standards | Below the standards | Below the standards |

TABLE 7

| | | | | Reference Example | | | | | | | | | | |
|---|---|---|---|---|---|---|---|---|---|---|---|---|---|---|
| | | | | 1* | 2* | 3* | 4* | 5* | 6* | 7* | 8 | 9 | 10 | 11 |
| Composition | Silicon compound | Amount (parts by weight) | | | | | | | 5 | | | | | |
| | | (A) Silicon-containing flame retardant Monomer unit (molar ratio) | U1 | 100 | 90 | 80 | 20 | 10 | 0 | 20 | 0 | 0 | 0 | 0 |
| | | | U2 | 0 | 10 | 20 | 80 | 90 | 100 | 80 | 0 | 0 | 0 | 0 |
| | | Other silicon compound | | | | | | — | | | fr1 | fr2 | fr3 | fr4 |
| | (B) Polymer (parts by weight) | HIPS | | | | 65 | | | | 60 | | 65 | | |
| | | PPE | | | | | | | | 5 | | | | |
| | | CaCO₃ | | | | | | | 30 | | | | | |
| Evaluation | Surface appearance | | | Δ | ○ | ○ | ◎ | ◎ | ◎ | ◎ | x | x | x | x |

*Showing a more preferred Reference Example.

TABLE 8

| | | | | Reference Example | | | | | | | | | | |
|---|---|---|---|---|---|---|---|---|---|---|---|---|---|---|
| | | | | 12 | 13* | 14* | 15* | 16* | 17* | 18 | 19 | 20 | 21 | |
| Composition | Silicon compound | Amount (parts by weight) | | | | | | 25 | | | | | | |
| | | (A) Silicon-containing flame retardant Monomer unit (molar ratio) | U1 | 100 | 90 | 80 | 20 | 10 | 0 | — | | | | |
| | | | U2 | 0 | 10 | 20 | 80 | 90 | 100 | | | | | |
| | | Other silicon compound | | | | | | — | | | fr1 | fr2 | fr3 | fr4 |
| | (B) Polymer (parts by weight) | PMMA | | | | | | 75 | | | | | | |
| Evaluation | Surface appearance | | | Δ | ○ | ○ | ◎ | ◎ | ◎ | x | x | x | x | |
| | Scratch resistance | | | Δ | ○ | ○ | ◎ | ◎ | ◎ | x | x | x | x | |

*Showing a more preferred Reference Example.

INDUSTRIAL APPLICABILITY

When the silicon-containing flame retardant of the present invention is added to an organic polymer, the resultant composition exhibits not only excellent flame retardancy but also excellent impact strength and excellent heat resistance. The composition obtained by adding the silicon-containing flame retardant of the present invention to an organic polymer can be advantageously used in various fields, for example, housings for household electric appliances, housings for office automation machines, electric and electronic parts, and parts for an automobile.

What is claimed is:

1. A silicon-containing flame retardant for an organic polymer, comprising a monomer, a polymer or a mixture thereof, which is represented by the following formula (1):

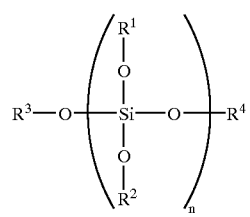

wherein:
each of $R^1$ and $R^2$ independently represents a $C_1$–$C_{20}$ alkyl group or a monovalent $C_6$–$C_{20}$ aromatic group;
each of $R^3$ and $R^4$ independently represents a $C_1$–$C_{20}$ alkyl group or a monovalent $C_6$–$C_{20}$ aromatic group, or each of $R^3$ and $R^4$ independently represents a $C_1$–$C_{20}$ alkylene group or a divalent $C_6$–$C_{20}$ aromatic group, with the proviso that, when each of $R^3$ and $R^4$ independently represents a $C_1$–$C_{20}$ alkylene group or a divalent $C_6$–$C_{20}$ aromatic group, $R^3$ and $R^4$ are bonded to each other to form a ring; that all of $R^1$, $R^2$, $R^3$ and $R^4$ are not simultaneously alkyl groups or monovalent aromatic groups; that, when each of $R^1$ and $R^2$ is an alkyl group, both of $R^3$ and $R^4$ are not simultaneously alkylene groups; and that, when each of $R^1$ and $R^2$ is a monovalent aromatic group, both of $R^3$ and $R^4$ are not simultaneously divalent aromatic groups; and n is 1 or more in terms of the number average n-value, wherein said polymer comprises a plurality of recurring units each represented by the following formula (2):

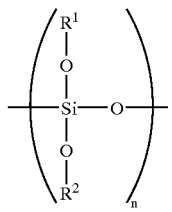

(2)

wherein each of $R^1$ and $R^2$ is as defined for formula (1), and a terminal $R^3$—O— group bonded to the silicon atom of a recurring unit of said formula (2) which is positioned at one terminal of said polymer, and a terminal $R^4$- group bonded to the oxygen atom of a recurring unit of said formula (2) which is positioned at the other terminal of said polymer, wherein each of $R^3$ and $R^4$ is as defined for formula (1), said recurring units each represented by formula (2) being the same or different, so that said polymer is a homopolymer or a copolymer, wherein said copolymer has a random, a block or an alternating configuration.

2. The flame retardant according to claim 1, which collectively contains at least two types of units selected from the group consisting of the following formulae (3) to (5):

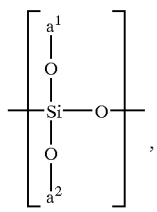

(3)

,

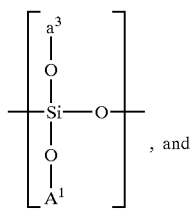

(4)

, and

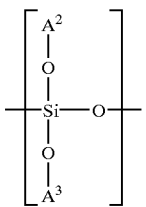

(5)

wherein each of $a^1$, $a^2$ and $a^3$ independently represents a $C_1$–$C_{20}$ alkyl group and each of $A^1$, $A^2$ and $A^3$ independently represents a monovalent $C_6$–$C_{20}$ aromatic group.

3. The flame retardant according to claim 1, wherein said aromatic group is present in an amount of from 10 to 90 mole %, based on the total molar amount of $R^1$, $R^2$, $R^3$ and $R^4$.

4. The flame retardant according to claim 1, wherein each of $R^1$ and $R^2$ independently represents a methyl group, a butyl group, a phenyl group or a benzyl group, and each of $R^3$ and $R^4$ independently represents a methyl group, a butyl group, a phenyl group or a benzyl group or independently represents a methylene group, a butylene group, a phenylene group or a benzylidene group.

5. The flame retardant according to claim 1, wherein n in formula (1) is 10 or more.

6. The flame retardant according to claim 1, which has a weight average molecular weight of from 1,000 to 1,000,000 as measured by gel permeation chromatography (GPC).

7. The flame retardant according to claim 1, comprising a mixture of a monomer represented by formula (1) and a polymer represented by formula (1), wherein said monomer is present in an amount of from more than 0 to 1% by weight, based on the weight of said mixture.

8. The flame retardant according to claim 1, which has a color number (APHA) of 20 or less as measured in accordance with JIS-K0101.

9. A method for imparting an organic polymer with a flame retardancy, which comprises adding to an organic polymer the silicon-containing flame retardant of claim 1.

* * * * *